(12) United States Patent
Hong et al.

(10) Patent No.: US 12,283,824 B2
(45) Date of Patent: Apr. 22, 2025

(54) ELECTRONIC DEVICE AND CONTROL METHOD THEREFOR

(71) Applicant: HUAWEI TECHNOLOGIES CO., LTD., Shenzhen (CN)

(72) Inventors: Liang Hong, Shenzhen (CN); Changsheng Pei, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 256 days.

(21) Appl. No.: 17/928,205

(22) PCT Filed: Mar. 3, 2021

(86) PCT No.: PCT/CN2021/078945
§ 371 (c)(1),
(2) Date: Nov. 28, 2022

(87) PCT Pub. No.: WO2021/244086
PCT Pub. Date: Dec. 9, 2021

(65) Prior Publication Data
US 2023/0129480 A1 Apr. 27, 2023

(30) Foreign Application Priority Data
Jun. 5, 2020 (CN) .......................... 202010507482.5

(51) Int. Cl.
*H02J 50/12* (2016.01)
*H02J 7/00* (2006.01)
(Continued)

(52) U.S. Cl.
CPC .......... *H02J 50/12* (2016.02); *H02J 7/00712* (2020.01); *H02J 50/80* (2016.02); *H02M 3/33584* (2013.01); *H02J 2207/20* (2020.01)

(58) Field of Classification Search
CPC ........ H02J 50/12; H02J 7/00712; H02J 50/80; H02J 2207/20; H02J 7/04; H02M 3/33584;
(Continued)

(56) References Cited

U.S. PATENT DOCUMENTS

2004/0012984 A1* 1/2004 Reass .................. H02M 3/3372
363/16
2017/0012470 A1 1/2017 Nakano et al.
(Continued)

FOREIGN PATENT DOCUMENTS

CN 102027691 A 4/2011
CN 103138358 A 6/2013
(Continued)

*Primary Examiner* — Jared Fureman
*Assistant Examiner* — Michael J Warmflash

(57) ABSTRACT

An electronic device and a control method for the electronic device are provided, and relate to the field of wireless charging technologies, to improve compatibility of a power receiving terminal device in wireless charging with a power transmitting terminal device by improving ASK communication quality. The electronic device includes a device circuit (50), a voltage conversion circuit (203), a rectifier circuit (202), a resonant circuit (201), and a modulation circuit (204). The resonant circuit (201) includes a resonant inductor (L2) and a resonant capacitor control circuit (ci1) connected in series to the resonant inductor (L2). A first end of the resonant inductor (L2) is coupled to the rectifier circuit (202), a second end of the resonant inductor (L2) is coupled to a first end of the resonant capacitor control circuit (ci1), and a second end of the resonant capacitor control circuit (ci1) is coupled to the rectifier circuit (202).

13 Claims, 22 Drawing Sheets

(51) Int. Cl.
*H02J 50/80* (2016.01)
*H02M 3/335* (2006.01)

(58) Field of Classification Search
CPC .... H02M 3/015; H02M 3/01; H02M 3/33553;
H02M 3/33576; H04B 5/72; H04B 5/48;
H04B 5/79; Y02B 70/10; H03H 11/28
See application file for complete search history.

(56) References Cited

U.S. PATENT DOCUMENTS

| | | | |
|---|---|---|---|
| 2018/0331577 A1* | 11/2018 | Proot | H02J 50/12 |
| 2019/0386525 A1* | 12/2019 | Smith | H02J 50/90 |
| 2019/0386571 A1* | 12/2019 | Dincan | H02M 3/3376 |
| 2020/0227946 A1* | 7/2020 | Mao | H02J 7/02 |

FOREIGN PATENT DOCUMENTS

| | | |
|---|---|---|
| CN | 103441783 A | 12/2013 |
| CN | 106571692 A | 4/2017 |
| CN | 109302070 A | 2/2019 |
| CN | 109861353 A | 6/2019 |
| CN | 110149291 A | 8/2019 |
| JP | 2017158260 A | 9/2017 |
| JP | 2019154117 A | 9/2019 |

\* cited by examiner

ELECTRONIC DEVICE AND CONTROL METHOD THEREFOR

CROSS-REFERENCE TO RELATED APPLICATIONS

This application is a national stage of International Application No. PCT/CN2021/078945, filed on May 3, 2021, which claims priority to Chinese Patent Application No. 202010507482.5 filed on Jun. 5, 2020. Both of the aforementioned applications are hereby incorporated by reference in their entireties.

TECHNICAL FIELD

This application relates to the field of wireless charging technologies, and in particular, to an electronic device and a control method for the electronic device.

BACKGROUND

A wireless charging technology is to induce energy from a primary coil of a power transmitting terminal device to a secondary coil of a power receiving terminal device through near-field electromagnetic induction, thereby completing power transmission. Usually, to achieve compatibility of various devices, a power receiving terminal device in wireless charging needs to be adapted to power transmitting terminal devices that satisfy a Qi standard, including a mobile phone, a tablet, a charging chassis, and the like supporting a reverse charging function. Transmitting terminals of different brands use different rectifier circuit (for example, alternating current (alternating current, AC) to direct current (direct current, DC) conversion, AC/DC) topologies, modulation modes, circuit parameters, operating frequencies, and control logic. Therefore, for different power transmitting terminal devices, the power receiving terminal device may not satisfy specifications of the Qi standard.

In a power transmission process of wireless charging, communication between the power transmitting terminal device and the power receiving terminal device in wireless charging supports ASK (amplitude shift keying, amplitude shift keying) modulation. ASK modulation is to modulate transmit power signal load through reverse reflection to achieve an objective of information transmission. As the load in the ASK modulation changes, a power signal envelope alternately appears to be in a high (high) or low (low) state. As specified in the Qi (an identity of the Wireless Power Consortium) protocol, if a change of a high/low state current is greater than 15 mA or a change of a high/low voltage is greater than 200 mV, information transmitted by a power signal envelope is valid; or if a change of a high/low state current is less than 8 mA or a change of a voltage is less than 100 my, information transmitted by a power signal envelope is invalid. Therefore, when a load impedance change causes a power (or power) signal distortion and an amplitude of a distorted voltage or current exceeds a data validity upper limit, incorrect demodulation by an ASK demodulation circuit is caused, and further, power transmission is interrupted. When the power signal distortion cycle approaches an ASK modulation cycle fclk=2 kHz, an electronic device cannot be wirelessly charged.

SUMMARY

Embodiments of this application provide an electronic device and a control method for the electronic device, to improve compatibility of a power receiving terminal device in wireless charging with a power transmitting terminal device by improving ASK communication quality.

According to a first aspect, an electronic device is provided. The electronic device includes a device circuit, a voltage conversion circuit, a rectifier circuit, a resonant circuit, and a modulation circuit. An input end of the device circuit is coupled to an output end of the voltage conversion circuit, an input end of the voltage conversion circuit is coupled to an output end of the rectifier circuit, an input end of the rectifier circuit is coupled to an output end of the resonant circuit, and the modulation circuit is coupled to the input end of the rectifier circuit. The resonant circuit is configured to induce an alternating magnetic field sent by a power transmitting terminal device to generate an induced alternating current; the modulation circuit is configured to modulate an amplitude of the induced alternating current; the rectifier circuit is configured to rectify the amplitude-modulated induced alternating current to generate a rectified voltage; and the voltage conversion circuit is configured to convert the rectified voltage into a load voltage and output the load voltage to the device circuit. In addition, the resonant circuit includes a resonant inductor and a resonant capacitor control circuit connected in series to the resonant inductor. A first end of the resonant inductor is coupled to the rectifier circuit, a second end of the resonant inductor is coupled to a first end of the resonant capacitor control circuit, and a second end of the resonant capacitor control circuit is coupled to the rectifier circuit. The resonant capacitor control circuit is configured to adjust a capacitance value of a resonant capacitor coupled to the resonant circuit. In this example, the resonant capacitor control circuit can adjust the capacitance value of the resonant capacitor coupled to the resonant circuit. Therefore, by adjusting the capacitance value of the resonant capacitor, a gain of the rectified voltage can be indirectly adjusted by adjusting the resonant capacitor, so that a problem of negative ASK modulation or decrease or increase of a voltage difference of the rectified voltage is resolved. Therefore, ASK communication quality is improved, and compatibility of the electronic device in wireless charging is improved.

In a possible design, an implementation of the resonant capacitor control circuit is provided. The resonant capacitor control circuit includes a capacitance value switching network formed by at least one switch and at least one capacitor, and the resonant capacitor control circuit is configured to control a status of the switch to adjust the capacitance value of the resonant capacitor coupled to the resonant circuit.

In a possible design, another implementation of the resonant capacitor control circuit is provided. The resonant capacitor control circuit includes an adjustable capacitor, a first end of the adjustable capacitor is coupled to the second end of the resonant inductor, and a second end of the adjustable capacitor is coupled to the rectifier circuit.

In a possible design, still another implementation of the resonant capacitor control circuit is provided. The resonant capacitor control circuit includes at least two parallel resonant capacitor regulating branches. A first end of the resonant capacitor regulating branch is coupled to the second end of the resonant inductor, and a second end of the resonant capacitor regulating branch is coupled to the rectifier circuit. A first switch and a first capacitor are connected in series on at least one resonant capacitor regulating branch, and the resonant capacitor control circuit adjusts, by adjusting a status of a first switch on the at least one resonant capacitor regulating branch, the capacitance value of the resonant capacitor coupled to the resonant circuit. One resonant capacitor regulating branch includes a second capacitor, a first end of the second capacitor is coupled to the second end of the resonant inductor, and a second end of the second capacitor is coupled to the rectifier circuit.

In a possible design, the first switch includes a bidirectional switching transistor.

In a possible design, the device circuit is further configured to detect the rectified voltage. When negative modulation of the rectified voltage occurs, the resonant capacitor control circuit increases the capacitance value of the resonant capacitor coupled to the resonant circuit, to recover positive modulation of the rectified voltage. Because the resonant capacitor is connected in series in the resonant circuit, during power transmission, main power is transmitted by using the resonant capacitor. Therefore, adjusting the resonant capacitor causes system instability. Therefore, capacitive reactance of ASK modulation is usually not optimized by adjusting the resonant capacitor. However, when negative ASK modulation occurs, ASK communication fails directly. Therefore, in this embodiment of this application, the resonant capacitor is mainly adjusted during negative ASK modulation.

In a possible design, the electronic device further includes a load control circuit. The load control circuit is coupled to the input end of the rectifier circuit, and the load control circuit is configured to connect a resistance value to the input end of the rectifier circuit when the rectified voltage is at a low level. In this example, because the load control circuit is coupled to the input end of the rectifier circuit, the load control circuit can connect the resistance value to the input end of the rectifier circuit when the rectified voltage is at the low level, and a modulation capacitor is disconnected when the rectified voltage is at the low level. In this case, a voltage gain needs to be reduced. Because the resistance value is connected to the input end of the rectifier circuit, energy of the input end of the rectifier circuit can be forcibly released when the modulation capacitor is disconnected. In this way, continuous increase of a voltage of a capacitor is avoided, and a modulation waveform is improved by dividing the rectified voltage. For example, low level burrs or oscillations are eliminated.

In a possible design, the device circuit is further configured to detect power corresponding to the rectified voltage and power consumed by the resistance value connected by the load control circuit to the input end of the rectifier circuit; and the load control circuit is configured to disconnect the resistance value when it is determined that the power corresponding to the rectified voltage is greater than the power consumed by the resistance value.

In a possible design, the electronic device further includes: the modulation circuit is configured to adjust a capacitance value of a modulation capacitor connected to the input end of the rectifier circuit. The modulation circuit can adjust the capacitance value of the modulation capacitor connected to the input end of the rectifier circuit, and the gain of the rectified voltage can be indirectly adjusted by adjusting the value of the modulation capacitor, so that the problem of negative ASK modulation or decrease or increase of the voltage difference of the rectified voltage Vrect is resolved. Therefore, ASK communication quality is improved, and compatibility of the electronic device in wireless charging is improved.

In a possible design, the device circuit is further configured to detect the rectified voltage; and when a maximum voltage difference of the rectified voltage is less than or equal to a first threshold voltage and the rectified voltage is at the low level, the modulation circuit is configured to increase the capacitance value of the modulation capacitor connected to the input end of the rectifier circuit; or when a maximum voltage difference of the rectified voltage is greater than or equal to a second threshold voltage and the rectified voltage is at the low level, the modulation circuit is configured to reduce the capacitance value of the modulation capacitor connected to the input end of the rectifier circuit, where the second threshold voltage is greater than the first threshold voltage. Because the resonant capacitor is connected in series in the resonant circuit, during power transmission, main power is transmitted by using the resonant capacitor. Therefore, adjusting the resonant capacitor causes system instability. Therefore, capacitive reactance of ASK modulation is usually not optimized by adjusting the resonant capacitor. However, when negative ASK modulation occurs, ASK communication fails directly. Therefore, in this application, the resonant capacitor is mainly adjusted during negative ASK modulation. A main cause of negative ASK modulation is that the resonant capacitor is overcompensated. Although adjusting the resonant capacitor can also optimize the voltage difference of the rectified voltage, considering impact of the adjustment on system stability, the voltage difference of the rectified voltage is mainly optimized by adjusting the modulation capacitor in this embodiment of this application.

According to a second aspect, an electronic device is provided. The electronic device includes a device circuit, a voltage conversion circuit, a rectifier circuit, a resonant circuit, and a modulation circuit. An input end of the device circuit is coupled to an output end of the voltage conversion circuit, an input end of the voltage conversion circuit is coupled to an output end of the rectifier circuit, an input end of the rectifier circuit is coupled to an output end of the resonant circuit, and the modulation circuit is coupled to the input end of the rectifier circuit. The resonant circuit is configured to induce an alternating magnetic field sent by a power transmitting terminal device to generate an induced alternating current; the modulation circuit is configured to modulate an amplitude of the alternating current; the rectifier circuit is configured to rectify the amplitude-modulated induced alternating current to generate a rectified voltage; and the voltage conversion circuit is configured to convert the rectified voltage into a load voltage and output the load voltage to the device circuit. The electronic device further includes a load control circuit. The load control circuit is coupled to the input end of the rectifier circuit, and the load control circuit is configured to connect a resistance value to the input end of the rectifier circuit when the rectified voltage is at a low level. In this example, because the load control circuit is coupled to the input end of the rectifier circuit, the load control circuit can connect the resistance value to the input end of the rectifier circuit when the rectified voltage is at the low level, and a modulation capacitor is disconnected when the rectified voltage is at the low level. In this case, a voltage gain needs to be reduced. Because the resistance value is connected to the input end of the rectifier circuit, energy of the input end of the rectifier circuit can be forcibly released when the modulation capacitor is disconnected. In this way, continuous increase of a voltage of a capacitor is avoided, and a modulation waveform is improved by dividing the rectified voltage. For example, low level burrs or oscillations are eliminated.

In a possible design, an implementation of the load control circuit is provided. The load control circuit includes a resistance value switching network formed by at least one switch and at least one resistor, and the load control circuit is configured to control a status of the switch to adjust the resistance value connected to the input end of the rectifier circuit.

In a possible design, another implementation of the load control circuit is provided. The load control circuit includes a first switch and a first resistor, a first end of the first resistor is coupled to the input end of the rectifier circuit, a second end of the first resistor is coupled to a first end of the first switch, and a second end of the first switch is grounded.

In a possible design, the device circuit is further configured to detect power corresponding to the rectified voltage and power consumed by the resistance value connected by the load control circuit to the input end of the rectifier circuit; and the load control circuit is configured to disconnect the resistance value when it is determined that the power corresponding to the rectified voltage is greater than the power consumed by the resistance value.

According to a third aspect, an electronic device is provided. The electronic device includes a device circuit, a voltage conversion circuit, a rectifier circuit, a resonant circuit, and a modulation circuit. An input end of the device circuit is coupled to an output end of the voltage conversion circuit, an input end of the voltage conversion circuit is coupled to an output end of the rectifier circuit, an input end of the rectifier circuit is coupled to an output end of the resonant circuit, and the modulation circuit is coupled to the input end of the rectifier circuit. The resonant circuit is configured to induce an alternating magnetic field sent by a power transmitting terminal device to generate an induced alternating current; the modulation circuit is configured to modulate an amplitude of the alternating current; the rectifier circuit is configured to rectify the amplitude-modulated induced alternating current to generate a rectified voltage; the voltage conversion circuit is configured to convert the rectified voltage into a load voltage and output the load voltage to the device circuit; and the modulation circuit is configured to adjust a capacitance value of a modulation capacitor connected to the input end of the rectifier circuit. The modulation circuit can adjust the capacitance value of the modulation capacitor connected to the input end of the rectifier circuit, and a gain of the rectified voltage can be indirectly adjusted by adjusting the value of the modulation capacitor, so that a problem of negative ASK modulation or decrease or increase of a voltage difference of the rectified voltage Vrect is resolved. Therefore, ASK communication quality is improved, and compatibility of the electronic device in wireless charging is improved.

In a possible design, an implementation of the modulation circuit is provided. The modulation circuit includes a capacitance value switching network formed by at least one switch and at least one capacitor, and the modulation circuit is configured to control a status of the switch to adjust the capacitance value of the modulation capacitor connected to the input end of the rectifier circuit.

In a possible design, another implementation of the modulation circuit is provided. The modulation circuit includes a first switch and an adjustable capacitor, a first end of the adjustable capacitor is coupled to the input end of the rectifier circuit, a second end of the adjustable capacitor is coupled to a first end of the first switch, and a second end of the first switch is coupled to the ground.

In a possible design, still another implementation of the modulation circuit is provided. The modulation circuit includes a first switch and at least two parallel modulation capacitor branches, a first end of the modulation capacitor branch is coupled to the input end of the rectifier circuit, a second end of the modulation capacitor branch is coupled to a first end of the first switch, and a second end of the first switch is coupled to the ground. The modulation capacitor branch includes a first capacitor and a second switch, a first end of the second switch is coupled to the input end of the rectifier circuit, a second end of the second switch is coupled to a first end of the first capacitor, and a second end of the first capacitor is coupled to the first end of the first switch. The modulation circuit adjusts, by adjusting a status of the second switch on the at least one modulation capacitor branch, the capacitance value of the modulation capacitor connected to the input end of the rectifier circuit. A second capacitor is connected in series on one modulation capacitor branch.

In a possible design, the device circuit is further configured to detect the rectified voltage; and when a maximum voltage difference of the rectified voltage is less than or equal to a first threshold voltage and the rectified voltage is at a low level, the modulation circuit is configured to increase the capacitance value of the modulation capacitor connected to the input end of the rectifier circuit; or when a maximum voltage difference of the rectified voltage is greater than or equal to a second threshold voltage and the rectified voltage is at a low level, the modulation circuit is configured to reduce the capacitance value of the modulation capacitor connected to the input end of the rectifier circuit, where the second threshold voltage is greater than the first threshold voltage. Because the resonant capacitor is connected in series in the resonant circuit, during power transmission, main power is transmitted by using the resonant capacitor. Therefore, adjusting the resonant capacitor causes system instability. Therefore, capacitive reactance of ASK modulation is usually not optimized by adjusting the resonant capacitor. However, when negative ASK modulation occurs, ASK communication fails directly. Therefore, in this application, the resonant capacitor is mainly adjusted during negative ASK modulation. A main cause of negative ASK modulation is that the resonant capacitor is overcompensated. Although adjusting the resonant capacitor can also optimize the voltage difference of the rectified voltage, considering impact of the adjustment on system stability, the voltage difference of the rectified voltage is mainly optimized by adjusting the modulation capacitor in this embodiment of this application.

According to a fourth aspect, a control method for the electronic device provided in the first aspect is provided. A resonant circuit of the electronic device includes a resonant inductor and a resonant capacitor control circuit connected in series to the resonant inductor. The control method for the electronic device includes: a device circuit detects a rectified voltage, and when negative modulation of the rectified voltage occurs, the resonant capacitor control circuit adjusts a capacitance value of a resonant capacitor coupled to the resonant circuit, to recover positive modulation of the rectified voltage.

In a possible design, that the resonant capacitor control circuit adjusts a capacitance value of a resonant capacitor coupled to the resonant circuit includes: the resonant capacitor control circuit increases the capacitance value of the resonant capacitor coupled to the resonant circuit.

In a possible design, the electronic device further includes a load control circuit; and when the rectified voltage is modulated by positive modulation, the control method includes: the load control circuit connects a resistance value to an input end of the rectifier circuit when the rectified voltage is at a low level.

In a possible design, the control method further includes: power corresponding to the rectified voltage and power consumed by the resistance value connected by the load control circuit to the input end of the rectifier circuit are detected; and the load control circuit disconnects the resistance value when it is determined that the power corresponding to the rectified voltage is greater than the power consumed by the resistance value.

In a possible design, when the rectified voltage is modulated by positive modulation, the control method further includes: when a maximum voltage difference of the rectified voltage is less than or equal to a first threshold voltage and the rectified voltage is at the low level, a modulation circuit increases a capacitance value of a modulation capacitor connected to the input end of the rectifier circuit; or when a maximum voltage difference of the rectified voltage is greater than or equal to a second threshold voltage and the rectified voltage is at the low level, a modulation circuit reduces a capacitance value of a modulation capacitor connected to the input end of the rectifier circuit, where the second threshold voltage is greater than the first threshold voltage.

For technical effects brought by any design in the fourth aspect, refer to technical effects brought by different designs in the first aspect. Details are not described herein again.

DESCRIPTION OF EMBODIMENTS

The following describes the technical solutions in embodiments of this application with reference to the accompanying drawings in embodiments of this application. It is clear that the described embodiments are merely some rather than all of embodiments of this application.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly indicate or implicitly include one or more such features. In the description of embodiments of this application, unless otherwise stated, "a plurality of" means two or more.

In addition, in embodiments of this application, directional terms such as "up", "down", "left", and "right" may include but are not limited to those defined relative to directions in which components are placed in the accompanying drawings. It should be understood that the directional terms may be relative concepts. The directional terms are used for relative description and clarification, and may vary accordingly depending on changes of the directions in which the components are placed in the accompanying drawings.

In the description of embodiments of this application, unless otherwise specified and defined explicitly, the terms "connection" should be understood in a broad sense. For example, the "connection" may refer to a fixed connection, a detachable connection, or an integral connection, and may refer to a direct connection or an indirect connection via an intermediate medium. In addition, the term "coupling" may be an electrical connection for implementing signal transmission. The "coupling" may be a direct electrical connection or an indirect electrical connection via an intermediate medium.

Figure 1:
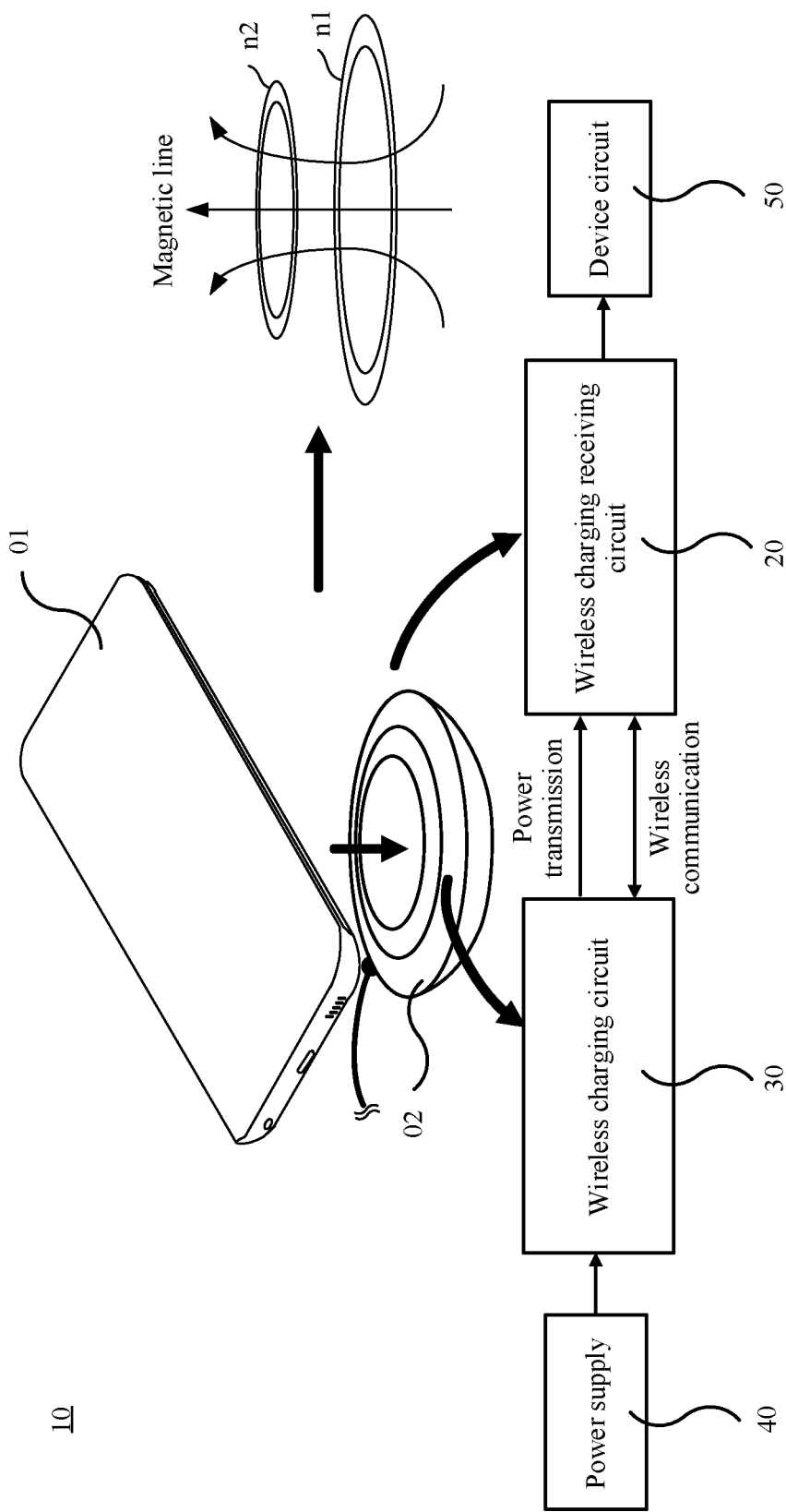
FIG. 1 is a schematic diagram of a structure of a wireless charging system according to an embodiment of this application.

Embodiments of this application are applied to a wireless charging system and used to implement WPC (wireless power consortium, WPC) wireless charging. A WPC wireless charging technology is to induce energy from a primary coil n1 to a secondary coil n2 through near-field electromagnetic induction (for example, magnetic lines shown in FIG. 1), thereby completing power transmission. Two power profiles for low and medium power devices include: a baseline power profile (baseline power profile, BPP, BPP≤5 W); and extended power profile (extended power profile, EPP, EPP≤15 W). The WPC wireless charging system includes a power transmitting terminal device and a power receiving terminal device. For example, the wireless charging system 10 includes two electronic devices, and one electronic device can wirelessly charge the other electronic device. As shown in FIG. 1, it is assumed that a second electronic device 02 wirelessly charges a first electronic device 01. The first electronic device 01 includes a mobile phone (mobile phone), a tablet computer (pad), a computer with a wireless transceiver function, an intelligent wearable product (for example, a smart watch or a smart band), a virtual reality (virtual reality, VR) terminal device, an augmented reality (augmented reality, AR) terminal device, or the like that has a wireless device. Alternatively, the first electronic device 01 may be an electronic product such as a wireless charging electric vehicle, a wireless charging household small electric appliance (such as a soymilk maker or a vacuum cleaning robot), or an unmanned aerial vehicle. A specific form of the first electronic device 01 is not specifically limited in embodiments of this application. For ease of description, it is hereinafter assumed that the first electronic device 01 is the mobile phone shown in FIG. 1.

Figure 2:
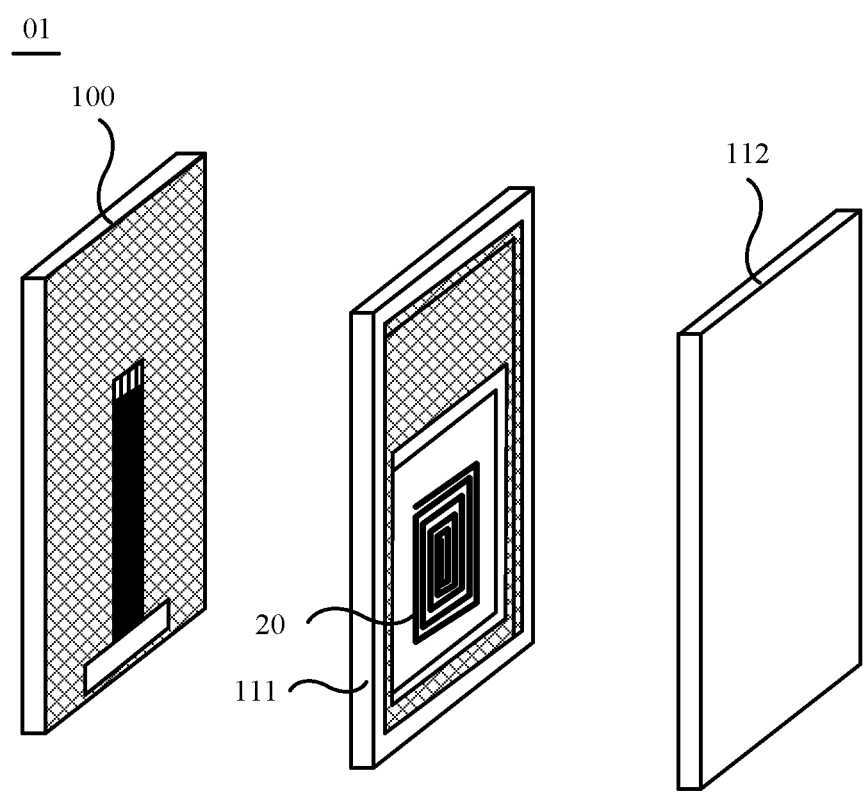
FIG. 2 is a schematic diagram of a structure of an electronic device according to an embodiment of this application.

To wirelessly charge the first electronic device 01, as shown in FIG. 1, a wireless charging receiving circuit 20 and a device circuit 50 coupled to the wireless charging receiving circuit 20 are disposed in the first electronic device 01. For example, as shown in FIG. 2, the first electronic device 01 mainly includes a display screen (display panel, DP) 101. The display screen 101 may be a liquid crystal display (liquid crystal display, LCD) screen or an organic light emitting diode (organic light emitting diode, OLED) display screen. This is not limited in embodiments of this application. The electronic device 01 further includes a middle frame 111 and a housing 112 shown in FIG. 2. The display screen 100 and the housing 112 are respectively located on two sides of the middle frame 111, a rear face of the display screen 100 faces the housing 112, and the display screen 100 and the housing 112 may be connected by the middle frame 111. The wireless charging receiving circuit 20 may be disposed on one side of the middle frame 111 facing the housing 112. The device circuit 50 may include components such as a processor, a radio frequency (radio frequency, RF) circuit, a power supply, a memory, an input unit, a display unit, and an audio circuit. Certainly, the device circuit 50 is merely an example herein, and may further include more or fewer components than the foregoing.

Using a charger as an example, the second electronic device 02 includes a wireless charging circuit 30 disposed in the charger 02 and a power supply 40 coupled to the wireless charging circuit 30, as shown in FIG. 1. The power supply 40 is configured to provide charging electric energy. In some embodiments of this application, the power supply 40 may be a power adapter. The power supply 40 may convert a 220 V alternating current into a direct current (for example, 5 V or 10 V) based on a charging power requirement, and transmit the direct current to the wireless charging circuit 30. Certainly, the second electronic device 02 may alternatively be a mobile phone, a tablet computer, or the like, to implement mutual charging between electronic devices.

The wireless charging system 10 can implement power transmission and communication transmission between the two electronic devices. A power transmission process includes: the second electronic device 02 converts input electric energy into electromagnetic energy by using a voltage converter; and the first electronic device 01 converts electromagnetic energy in a magnetic field into electric energy by using a rectifier circuit and outputs the electric energy to the subsequent device circuit for use. A communication transmission process includes: the second electronic device 02 supports ASK modulation or FSK modulation, and the first electronic device 01 supports ASK modulation or FSK demodulation; therefore, a power transmitting terminal device modulates a communication transmission signal onto electromagnetic energy for power transmission, and a power receiving terminal device demodulates the communication transmission signal from the electromagnetic energy. Usually, for the baseline power profile and the extended power profile, ASK modulation is a mandatory functional part. Embodiments of this application mainly relate to ASK modulation. Therefore, the following example mainly uses ASK modulation as an example for description.

Figure 3:
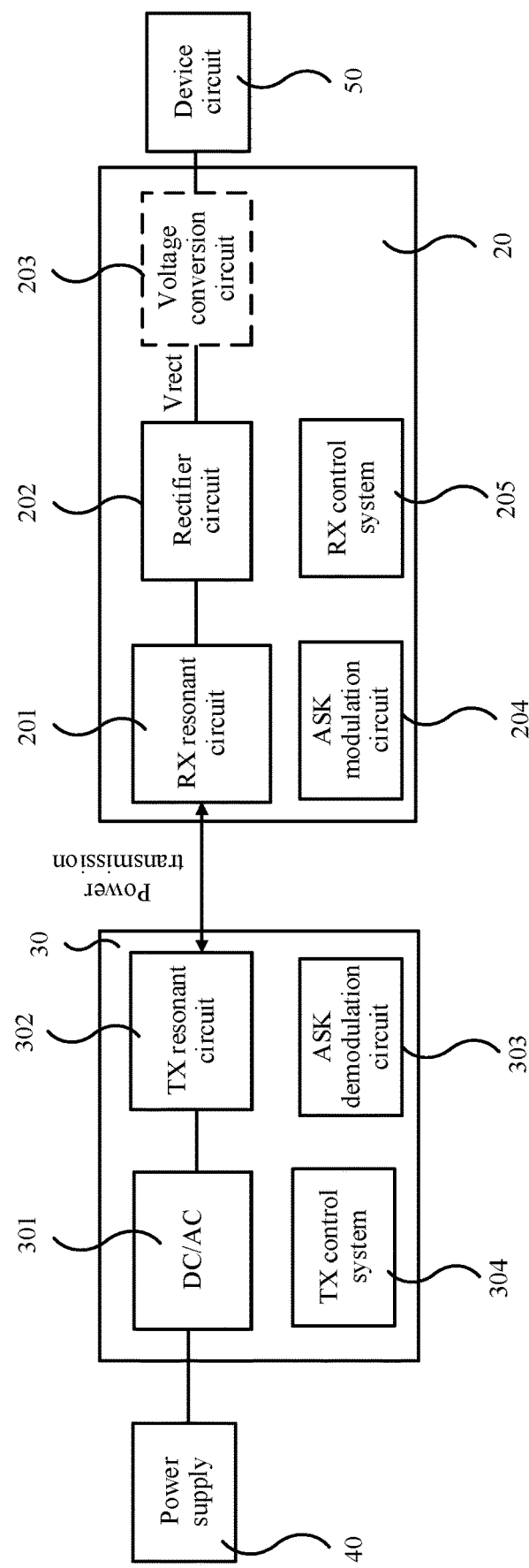
FIG. 3 is a schematic diagram of a structure of a wireless charging system according to another embodiment of this application.
Figure 4:
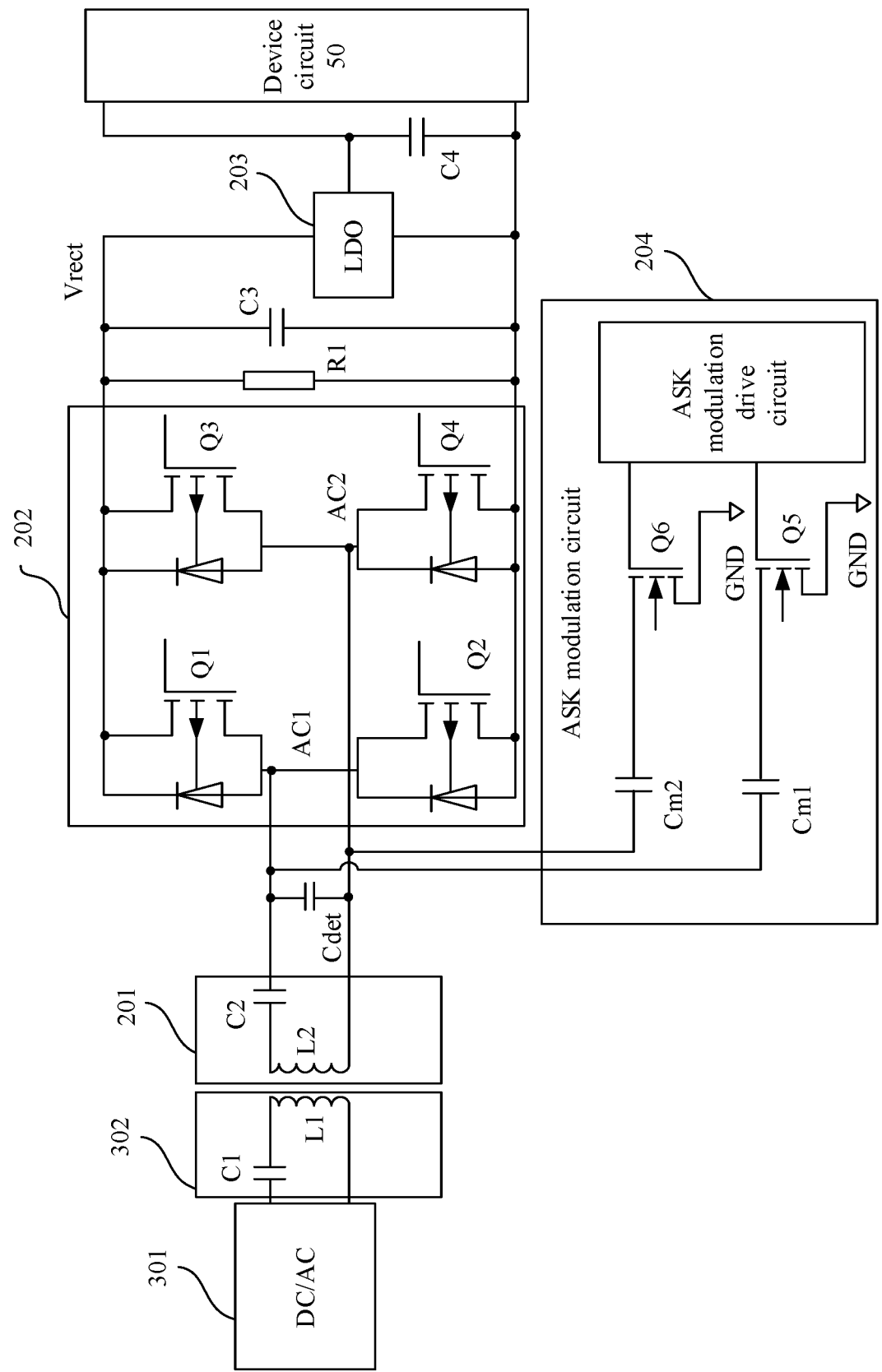
FIG. 4 is a schematic diagram of a structure of a wireless charging system according to still another embodiment of this application.

For example, when one side of the first electronic device 01 on which the housing 112 is located is placed on the charger 02, to wirelessly charge the first electronic device 01, as shown in FIG. 3, the wireless charging circuit 30 includes a voltage converter 301 and a TX (transport, transmit) resonant circuit 302. The voltage converter 301 may be a DC to AC converter, that is, DC/AC. As shown in FIG. 4, a specific circuit of the TX resonant circuit 302 is provided. The circuit includes a TX resonant capacitor C1 and a TX resonant inductor L1 (that is, the primary coil n1 in FIG. 1), where C1 and L1 are connected in series to an output end of the voltage converter 301. The wireless charging receiving circuit 20 further includes an RX (receive, receive) resonant circuit 201 and a rectifier circuit 202.

Based on this, the voltage converter 301 is coupled to the power supply 40, and can convert a direct current output by the power supply 40 into an alternating current. In addition, the TX resonant circuit 302 is coupled to the voltage converter 301. After receiving the alternating current output by the voltage converter 301, the TX resonant circuit 302 may generate an alternating magnetic field. The RX resonant circuit 201 receives the alternating magnetic field and outputs an induced alternating current, so that power of the TX resonant circuit 302 can be transmitted to the RX resonant circuit 201. As shown in FIG. 4, a specific circuit of the RX resonant circuit 201 is provided. The circuit includes an RX resonant capacitor C2 and an RX resonant inductor L2 (that is, the secondary coil n2 in FIG. 1) that are connected in series.

In addition, the RX resonant circuit 201 is coupled to the rectifier circuit 202, and the rectifier circuit 202 may rectify the induced alternating current output by the RX resonant circuit 201, to generate a rectified voltage Vrect. The rectifier circuit 202 may be an alternating current to direct current converter, that is, AC/DC. An example drawing of the rectifier circuit 202 is shown in FIG. 4. The rectifier circuit 202 includes four switching transistors Q1 to Q4, where Q1 and Q4 are connected to form a full-bridge rectifier. The TX resonant circuit 302 is connected to two input ends AC1 and AC2 of the full-bridge rectifier, the induced alternating current is input to the full-bridge rectifier through AC1 and AC2, and the full-bridge rectifier rectifies the induced alternating current and outputs the rectified voltage Vrect at an output end. For example, as shown in FIG. 4, a rectifier capacitor C3 and a resistor R1 are connected in parallel at the output end of the full-bridge rectifier, where the resistor R1 provides an energy discharge channel for C3.

On this basis, the wireless charging receiving apparatus 20 further includes at least one voltage conversion circuit 203 coupled to the rectifier circuit 202. The voltage conversion circuit 203 may convert the rectified voltage Vrect into a load voltage, and output the load voltage to the device circuit 50 to supply power to the device circuit 50. For example, when the device circuit includes a battery, the voltage conversion circuit 203 converts the rectified voltage Vrect into a charging voltage (for example, 3.7 V). After the charging voltage is applied to both ends of the battery, a current output by the voltage conversion circuit 203 can charge the battery 50. In some embodiments of this application, the voltage conversion circuit 203 includes a DC/DC conversion circuit. The DC/DC conversion circuit may be a buck (Buck) circuit, a switched capacitor (switched capacitor, SC) circuit, or a low dropout linear regulator (low dropout regulator, LDO). An input/output voltage ratio of the buck circuit may be flexibly adjusted. For example, the input/output voltage ratio may be set to a decimal. An input/output voltage ratio of the SC circuit is an integer, but the SC circuit can withstand a relatively high difference between an input voltage and an output voltage and has relatively high voltage conversion efficiency. An input voltage is relatively close to an output voltage of the LDO, and voltage conversion efficiency is relatively high. As shown in FIG. 4, assuming that the voltage conversion circuit 203 is the LDO, a filter capacitor C4 is further connected in parallel at an output end of the LDO. As shown in FIG. 4, a detection capacitor Cdet is further connected in parallel at an output end of the RX resonant circuit 201. Because the detection capacitor Cdet is disposed in the first electronic device 10, in the wireless charging system, when the first electronic device 10 is placed near the second electronic device 20, the detection capacitor Cdet can change a resonant frequency of the wireless charging system. After sampling the resonant frequency, the second electronic device 20 determines that the first electronic device 10 is waiting to be charged.

Figure 5:
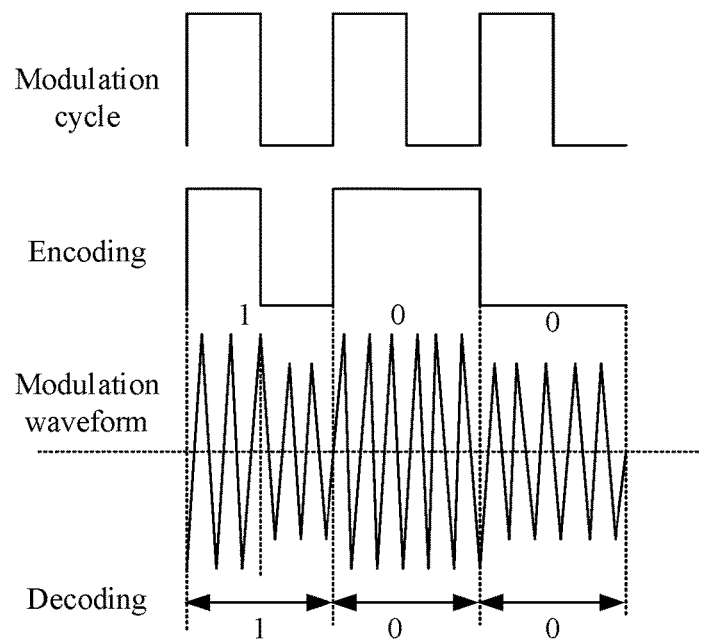
FIG. 5 is a schematic diagram of a modulation waveform according to an embodiment of this application.
Figure 6:
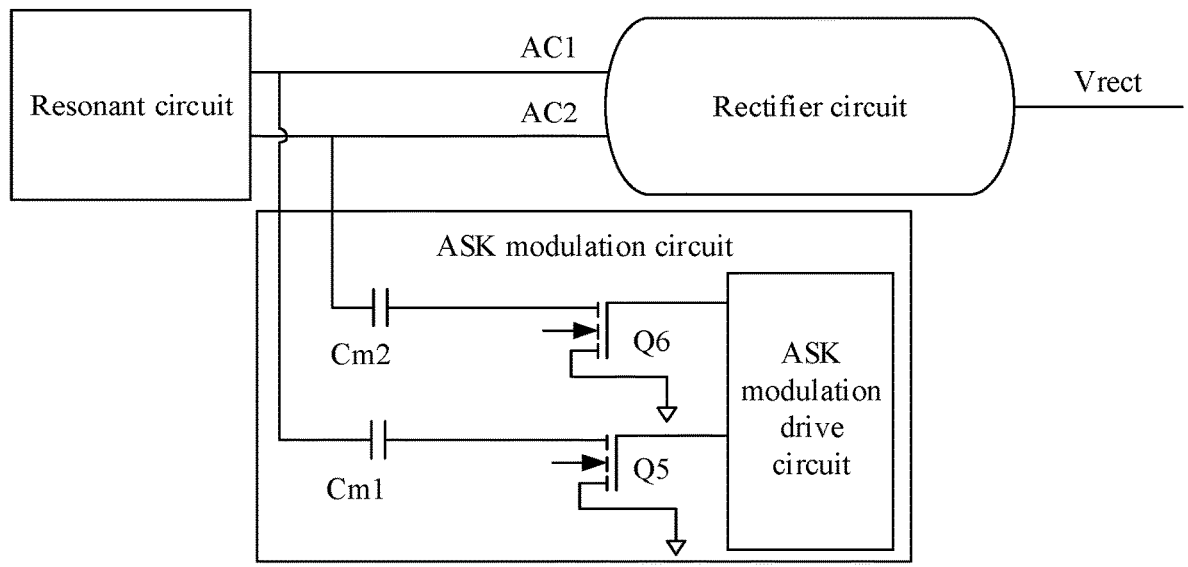
FIG. 6 is a schematic diagram of a structure of an ASK modulation circuit according to an embodiment of this application.
Figure 7:
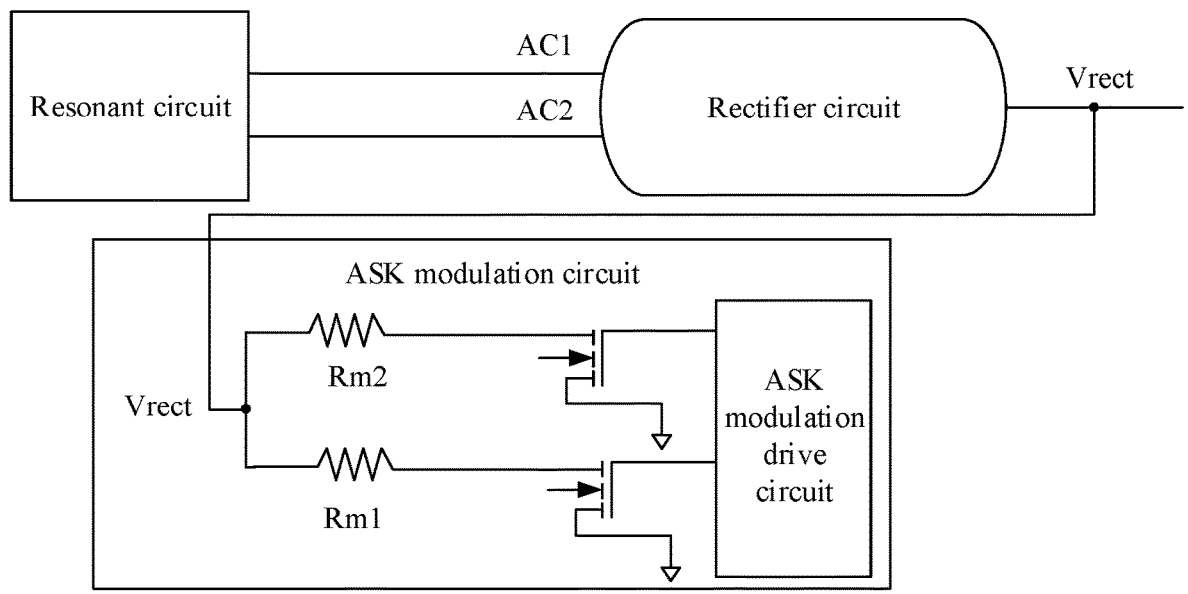
FIG. 7 is a schematic diagram of a structure of an ASK modulation circuit according to another embodiment of this application.

The power transmission process of the wireless charging system is described above. For the communication transmission process, in particular, communication transmission is implemented in an ASK modulation mode. As shown in FIG. 3, the wireless charging receiving circuit 20 further includes an ASK modulation circuit 204, and the wireless receiving circuit 30 further includes an ASK demodulation circuit 303. ASK modulation is to modulate transmit power signal load through reverse reflection to achieve an objective of information transmission. The ASK modulation circuit 204 modulates a received transmit power signal into a waveform signal by adjusting the transmit power signal load (for example, impedance or capacitive reactance) in the power receiving terminal device, so that a communication transmission signal is carried in the waveform signal. The ASK demodulation circuit 303 demodulates the communication transmission signal based on the reversely reflected waveform signal received by the power transmitting terminal device. Specifically, an example is as follows: The Qi protocol specifies that an internal clock in ASK modulation is 2 kHz, and a differential biphase coding scheme is used to modulate data bits onto power signals transmitted by the power receiving terminal device and the power transmitting terminal device. As shown in FIG. 5, the differential biphase coding scheme is described as follows: In one clock cycle (or modulation cycle), a modulation waveform of a voltage or a current changes twice, the power receiving terminal device encodes (encode) 1 for outputting, and the power transmitting terminal device decodes (decode) 1; the waveform of the voltage or current changes once, the power receiving terminal device encodes 0 for outputting, and the power transmitting terminal device decodes (decode) 0. If a positive maximum amplitude (and a negative maximum amplitude) of the modulation waveform remains unchanged in one clock cycle, it is considered that the voltage or current changes once. If the positive maximum amplitude (and the negative maximum amplitude) of the modulation waveform changes from a first amplitude to a second amplitude in one clock cycle, it is considered that the voltage or current changes twice. The power receiving terminal device uses two ASK modulation modes: a capacitive mode and a resistive mode. As shown in FIG. 4 and FIG. 6, capacitive ASK modulation changes a load characteristic of the power receiving terminal device by coupling two capacitors Cm1 and Cm2 to two input ends AC1 and AC2 of the rectifier circuit 202, thereby changing a voltage gain of the entire circuit and ultimately changing an amplitude of a power signal. Specifically, in the ASK modulation circuit 204, the capacitor Cm1 and a switch Q5 are connected in series between the input end AC1 of the rectifier circuit and the ground GND, and the capacitor Cm2 and a switch Q6 are connected in series between the input end AC2 of the rectifier circuit and the ground GND, where turn-on/off of the switches Q5 and Q6 is controlled by an ASK modulation drive circuit. Specifically, referring to FIG. 5, when the switches Q5 and Q6 are in different states, the load in the ASK modulation changes, and a power signal envelope alternately appears to be in a high (HI) or low (LO) state. For example, in a positive cycle of the modulation waveform, the modulation waveform needs to be modulated to a relatively high amplitude (High level, which is used as an example in all the following schemes), Q5 may be controlled to be turned on, and Cm1 may be controlled to be connected to AC1; or when the modulation waveform needs to be modulated to a relatively low amplitude (Low level, which is used as an example in all the following schemes), Q5 may be controlled to be turned off, and Cm1 may be controlled to be disconnected from AC1. Similarly, in a negative cycle of the modulation waveform, when the modulation waveform needs to be modulated to a relatively high amplitude (high level), Q6 may be controlled to be turned on, and Cm2 may be controlled to be connected to AC2; or when the modulation waveform needs to be modulated to a relatively low amplitude (low level), Q6 may be controlled to be turned off, and Cm2 may be controlled to be disconnected from AC2. In this way, positive modulation (also referred to as positive ASK modulation in the following schemes) is implemented, where Q5 and Q6 may be switching transistors, and a gate of the switching transistor is coupled to the ASK modulation drive circuit to receive a gating signal of the ASK modulation drive circuit and control turn-on/off of Q5 and Q6. When modulation capacitors are connected to AC1 and AC2, if the modulation waveform is modulated to a relatively low amplitude, but the modulation waveform is modulated to a relatively high amplitude after the modulation capacitors are disconnected from AC1 and AC2, the modulation is negative modulation (also referred to as negative ASK modulation in the following schemes). As shown in FIG. 7, resistive ASK modulation changes the load characteristic of the receiving terminal by connecting two parallel resistors Rm1 and Rm2 to an output end of the rectifier, thereby changing the voltage gain of the entire circuit and ultimately changing the amplitude of the transmit power signal. Specifically, in the ASK modulation circuit 204, the resistor Rm1 and a switch Q7 are connected in series between the output end Vrect of the rectifier circuit and the ground GND, and the resistor Rm2 and a switch Q8 are connected in series between the output end Vrect of the rectifier circuit and the ground GND, where turn-on/off of the switches Q7 and Q8 is controlled by the ASK modulation drive circuit, and Q7 and Q8 may be switching transistors.

Based on the foregoing description, power transmission and communication transmission may be established between the first electronic device 10 and the second electronic device 20. To control the power transmission process and the communication transmission process, as shown in FIG. 3, the wireless charging receiving circuit 20 further includes an RX control system 205, and the wireless charging circuit 30 further includes a TX control system 304. The RX control system 205 and the TX control system 304 may transmit a control signal by using the communication transmission established between the first electronic device 10 and the second electronic device 20, to control the power transmission and the communication transmission process. For example, the control signal may be transmitted or charging data may be transmitted. The charging data may be used to indicate a charging type, charging power, or the like.

Figure 8:
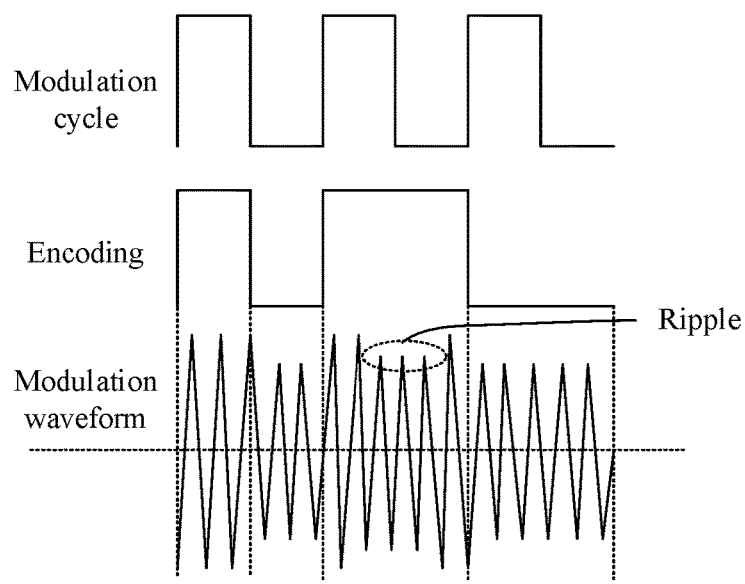
FIG. 8 is a schematic diagram of a modulation waveform according to another embodiment of this application.

To achieve compatibility of various devices, the power receiving terminal device in wireless charging needs to be adapted to all power transmitting terminal devices that satisfy the Qi standard, including a mobile phone, a tablet, a charging chassis, and the like supporting a reverse charging function. Transmitting terminal devices of different brands use different AC_DC converter topologies, modulation modes, circuit parameters, operating frequencies, and control logic. Therefore, for different power transmitting terminal devices, the power receiving terminal device cannot satisfy specifications of the Qi protocol. With reference to the foregoing description, when the load in ASK modulation changes, the power signal envelope alternately appears to be in the high (HI) or low (LO) state. As specified in the Qi protocol, if a change of a high/low state current is greater than 15 mA or a change of a high/low voltage is greater than 200 mV, information transmitted by a power signal envelope is valid; or if a change of a high/low state current is less than 8 mA or a change of a voltage is less than 100 mV, information transmitted by a power signal envelope is invalid. Regardless of the current or voltage, the power signal needs to ensure a valid voltage difference or current difference. When a load impedance change causes a power signal distortion and an amplitude of a distorted voltage or current exceeds a data validity upper limit, incorrect demodulation by the ASK demodulation circuit is caused, and further, power transmission is interrupted. When a power signal distortion cycle approaches an ASK modulation cycle fclk=2 kHz, the electronic device cannot be wirelessly charged. As shown in FIG. 8, a ripple (ripple) generated by the power signal is distorted, and the electronic device cannot be wirelessly charged if the distortion exceeds a degree. Therefore, a wireless charging compatibility test item is a difficulty in obtaining wireless charging Qi certification. The power receiving terminal device in wireless charging needs to be adapted, as much as possible, to power transmitting terminal devices that satisfy the Qi standard in the market. In the power transmission process of wireless charging, the power receiving terminal device performs data communication with the power transmitting terminal device through ASK modulation to implement closed-loop regulation of the entire system. However, an abnormality of ASK modulation or an abnormality of ASK demodulation will interrupt wireless charging power transmission. Therefore, improving ASK communication quality can improve compatibility of the power receiving terminal device in wireless charging, thereby resolving a series of problems such as charging interruption and charging termination caused by compatibility.

Figure 9:
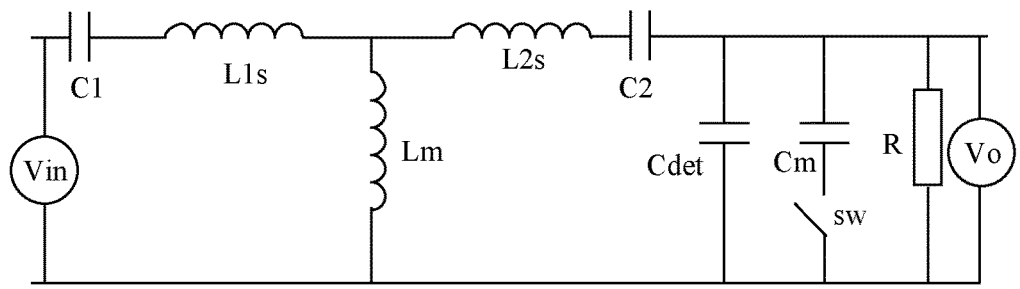
FIG. 9 is a schematic diagram of an equivalent circuit of the wireless charging system shown in FIG. 4 according to an embodiment of this application.

Based on the foregoing problem, an equivalent circuit of the wireless charging system shown in FIG. 4 is obtained by analyzing the wireless charging system, as shown in FIG. 9, where $L1s$ is leakage inductance of the TX resonant inductor; $L1$ is self-inductance of the TX resonant inductor L1; $L2s$ is leakage inductance of the RX resonant inductor L2; $L2$ is self-inductance of the RX resonant inductor L2; Lm is excitation inductance of the TX resonant inductor L1 and the RX resonant inductor L2; C1 is capacitance of the TX resonant capacitor C1; C2 is capacitance of the RX resonant capacitor C2; Cd is an equivalent capacitor, mainly including the detection capacitor Cdet and the modulation capacitor Cm (Cm1 and Cm2); R is an equivalent resistor of the rectifier circuit 202; k is a coupling factor between the TX resonant inductor L1 and the RX resonant inductor L2; and n is a turns ratio of the TX resonant inductor L1 to the RX resonant inductor L2.

The following can be obtained through parameter normalization:

$$L1s = (1-k)L1,$$
$$L2s = n^2(1-k)L2 = L1s, \text{ and}$$
$$Lm = kL1;$$

-continued $$\omega 0 = \frac{1}{\sqrt{L1s*C1}},$$

$$\omega n = \frac{\omega}{\omega 0}, \text{ and}$$

$$Qn = \frac{\omega 0 * L1}{R};$$

$$\alpha = C1/C2;$$

$$\beta = Cd/C1;$$

$$Z_1 = \frac{1}{j\omega C1} + j\omega * L1s;$$

$$Z_2 = \frac{1}{j\omega C2} + j\omega * L2s;$$

$$Z_m = j\omega * Lm;$$

$$Z_d = \frac{1}{j\omega * Cd};$$

and $Z_R$=R, where ω is an operating angular frequency of the device (the angular frequency ω is equal to 2πf, and f is an actual operating frequency of the device), ω0 is a reference angular frequency, ωn is a scalarized operating angular frequency of the device, Qn is a quality factor of the equivalent circuit and the quality factor represents overall load of the equivalent circuit, α is a resonant capacitance ratio, and β is a detection capacitance ratio. Because Cd is an equivalent capacitor including the detection capacitor Cdet and the modulation capacitor Cm, it can also be used to measure the modulation capacitance ratio and is therefore also referred to as the modulation capacitance ratio in the following scheme. $Z_1$ is leakage inductance impedance of the TX resonant inductor L1. $Z_2$ is impedance of the RX resonant inductor L2. $Z_m$ is excitation impedance of the TX resonant inductor L1, $Z_d$ is impedance of Cd, and $Z_R$ is impedance of the rectifier circuit 202.

According to a fundamental wave analysis (fundamental wave analysis, FHA) method, a high-order harmonic wave is ignored and attention is focused on only a fundamental component. The rectifier circuit 202 uses a full-bridge rectifier. When an input voltage of the rectifier circuit is positive, the input voltage is clamped by an output voltage, and a voltage value is Vo; or when an input voltage of the rectifier circuit is negative, the input voltage is clamped by an output voltage, and a voltage value is –Vo. Therefore, the input voltage is a positive or negative square wave whose amplitude is Vo. Fourier decomposition may be performed to obtain a fundamental component Vrect(t):

$$Vrect(t) = \frac{4}{\pi}V_o\sin(t*\omega s),$$

where, ωs is the operating angular frequency of the device (that is, the foregoing ω).

A valid value Vrect of a fundamental component of the voltage is $$Vrect = \frac{2\sqrt{2}}{\pi}V_o.$$

In a full-bridge rectifier topology of the rectifier circuit, the voltage and the current are cophased. Therefore, the current irect(t) input to the rectifier circuit is irect(t)=$\sqrt{2}I_m$ sin(t*ωs), where $I_m$ is a valid value of the current.

A valid value Irect of a fundamental component of the current is:

$$Irect = \frac{2}{T_s}\int_0^{T_s/2} irect(t)dt = \frac{2\sqrt{2}}{\pi}I_m,$$

where a cycle of a sinusoidal component is Ts=2π/ws.

Therefore, converted input resistance R of the full-bridge rectifier of the power transmitting terminal device is:

$$R = Vrect/Irect = \frac{8}{n^2\pi^2}R_{load},$$

where $R_{load}$ is equivalent input impedance of the device circuit.

A voltage gain of the wireless charging system is obtained by combining the foregoing equations:

$$Mv(k, \alpha, \beta, Qn, \omega n) =$$

$$\frac{\omega n^3 k}{-\beta(k+1)\omega n^5 + (\alpha\beta+\beta+1)\omega n^3 + (\alpha\beta+1)(k+1)\omega n + j\{(k-1)(\alpha+1)Qn*\omega n^2 - (k-1)(k+1)Qn*\omega n^4 + (k-1)^2\alpha\}}.$$

Voltage gain modulus length:

$$|Mv| = \frac{\omega n^3 k}{\sqrt{Qn^2(k-1)^2\{(\omega n^2+k-1)\alpha - \omega n^4 k - \omega n^4 + \omega n^2\}^2 + \omega n^2\{(\omega n^2+k-1)\alpha\beta + (-\omega n^4 k - \omega n^4 + \omega n^2)\beta + \omega n^2 + k - 1\}^2}}.$$

Current gain:

$$Mi(k, \alpha, \beta, Qn, \omega n) =$$

$$\frac{\omega n^2 k\{\beta\omega n + j(k-1)Qn\}}{\beta\omega n^3 + (\alpha\beta+1)(k+1)\omega n + j\{(k-1)Qn*\omega n^2 + (k-1)^2\alpha Qn\}}.$$

Current gain modulus length:

$$|Mi| =$$

$$\omega n^2 k\sqrt{\frac{\beta^2\omega n^2 + Qn^2(k-1)^2}{Qn^2(k-1)^2(k\alpha+\omega n^2-\alpha)^2 + \{(k\alpha+\omega n^2-\alpha)\beta+k-1\}^2\omega n^2}}.$$

It can be learned from the expressions that the voltage gain Mv and the current gain Mi are six-variable functions. To be specific, the voltage gain Mv and the current gain Mi are both related to the coupling factor k, the turns ratio n, the resonant capacitance ratio α, the modulation capacitance ratio β, a load magnitude (the quality factor Qn represents the load magnitude of the wireless charging system), and the operating angular frequency ωn.

Figure 10:
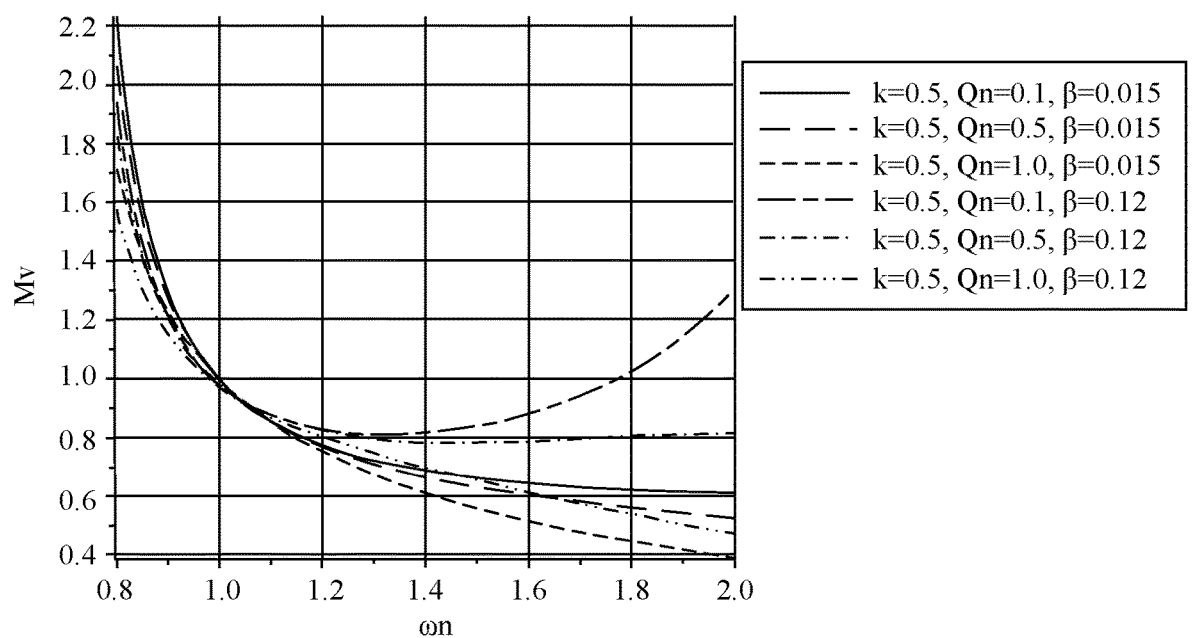
FIG. 10 is a schematic diagram of a voltage gain curve of a wireless charging system according to an embodiment of this application.

Based on the equivalent circuit shown in FIG. 9, a voltage gain curve shown in FIG. 10 is drawn with the coil turns ratio n=1, the coil coupling factor k=0.5, and the resonant capacitance ratio α=25/21, where a horizontal axis is the scalarized operating angular frequency ωn, and a vertical axis is the voltage gain Mv. When k=0.5, according to the wireless charging Qi standard, the operating frequency is 100 kHz to 200 kHz, and the scalarized operating angular frequency ωn is 1.0 to 2.0. Using FIG. 10 as an example, when Qn=0.1, and ωn=1.6, and β=0.12, Mv≈0.9; when β=0.015, Mv≈0.68, that is, Mv increases with the increase of β, and the voltage gain Mv is positively correlated with the modulation capacitance ratio β. Using FIG. 10 as an example, when β=0.015, and ωn=1.6, and Qn=0.1, Mv≈0.68; when Qn=0.5, Mv≈0.6, that is, Mv decreases with the increase of Qn, and the voltage gain Mv is negatively correlated with the quality factor Qn. In addition, with reference to principles of ASK modulation described in FIG. 3 to FIG. 6, it can be learned that the voltage gain is increased when the modulation capacitor is connected, and the voltage gain is decreased when the modulation capacitor is disconnected. Therefore, if the voltage gain is larger after the modulation capacitor is connected, a voltage difference of Vrect is larger after the modulation capacitor is disconnected. Therefore, increasing the modulation capacitance ratio β (that is, increasing the modulation capacitance) helps increase a voltage difference in ASK modulation, that is, helps increase the voltage difference of Vrect. For example, when Qn=0.1, and ωn=1.6, and β=0.015, if ωn=1.6, the voltage gain Mv≈0.68. In this case, if the voltage difference W of Vrect is 98 mV, as described above, 98 mV<100 my, and ASK communication failure may occur. If ωn=1.6 and β=0.12, the voltage gain Mv≈0.9. In this case, the voltage difference W of Vrect is 98 mV*(0.9/0.68)≈130 mV, and 130 mV>100 mV, which satisfies an ASK communication requirement, and δV is increased from 98 mV to 130 mV when the modulation capacitance ratio β is increased. Apparently, increasing the modulation capacitance ratio β can avoid impact of an excessively small voltage difference of Vrect on ASK communication quality, and decreasing the modulation capacitance ratio β can avoid impact of an excessively large voltage difference of Vrect on ASK communication quality.

Figure 11:
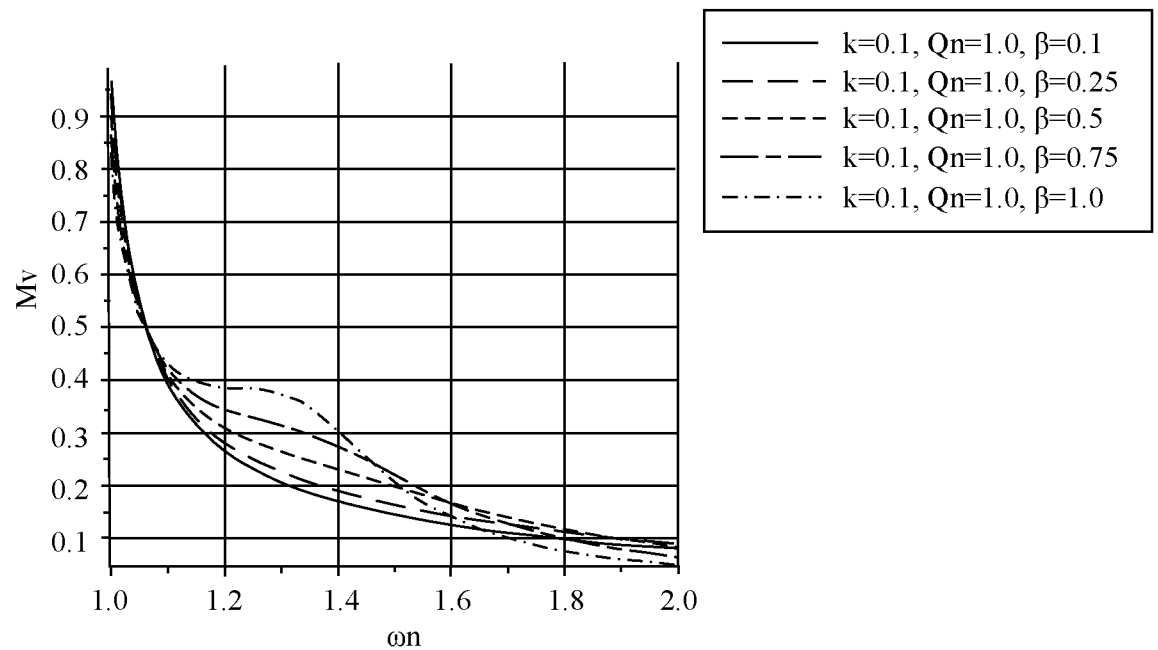
FIG. 11 is a schematic diagram of a voltage gain curve of a wireless charging system according to another embodiment of this application.
Figure 12:
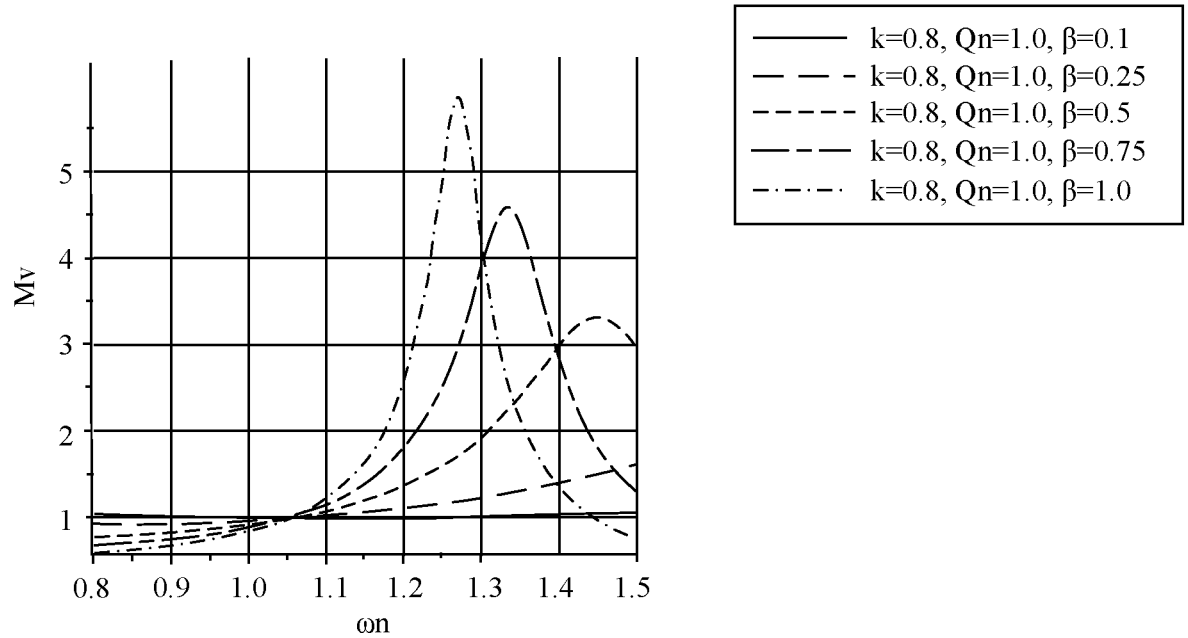
FIG. 12 is a schematic diagram of a voltage gain curve of a wireless charging system according to still another embodiment of this application.

With reference to FIG. 11, a voltage gain curve is drawn with the quality factor Qn=1.0 and the relatively low coupling factor k=0.1, where a horizontal axis is the scalarized operating angular frequency ωn, and a vertical axis is the voltage gain Mv. The modulation capacitance ratio β is 0.1, 0.25, 0.5, 0.75, and 1.0 in sequence. When k=0.1, according to the wireless charging Qi standard, the operating frequency is 100 kHz to 200 kHz, and the scalarized operating angular frequency ωn is 1.35 to 2.7. Because a value of k=0.1 is relatively small, the leakage inductance L1s becomes large, and the frequency needs to be reduced (that is, the operating angular frequency is reduced) to improve a loading capability. Therefore, the system works near ωn=1.35 (as shown in FIG. 11, ωn is 1.05 to 1.45). For example, when ωn=1.3 and β=0.75, MV≈0.33; when ωn=1.3 and β=0.1, MV≈0.2, that is, Mv increases with the increase of β. Apparently, increasing the modulation capacitance ratio β can increase a loop voltage gain, thereby improving the loading capability and enhancing ASK communication quality. With reference to FIG. 12, a voltage gain curve is drawn with the quality factor Qn=1.0 and the relatively high coupling factor k=0.8, where a horizontal axis is the scalarized operating angular frequency ωn, and a vertical axis is the voltage gain Mv. The modulation capacitance ratio β is 0.1, 0.25, 0.5, 0.75, and 1.0 in sequence. In comparison with FIG. 10, in FIG. 12, the coupling factor k (k=0.8) is relatively large, the leakage inductance L1s becomes small, and therefore the reference angular frequency $$\omega 0 = \frac{1}{\sqrt{L1s * C1}}$$

becomes large; and further, after the reference angular frequency becomes large, the scalarized operating angular frequency ωn becomes small. For example, when k=0.5, the scalarized operating angular frequency ωn is 1.0 to 2.0, and after the coupling factor k becomes large, the scalarized operating angular frequency is 0.63 to 1.26. However, in FIG. 12, before ωn=1.05, Mv decreases with the increase of β, and negative ASK modulation occurs. Therefore, in the positive ASK modulation process (the scalarized operating angular frequency is 1.05 to 1.26), increasing the modulation capacitance ratio β can increase the loop voltage gain, thereby improving the loading capability and enhancing ASK communication quality.

Figure 13:
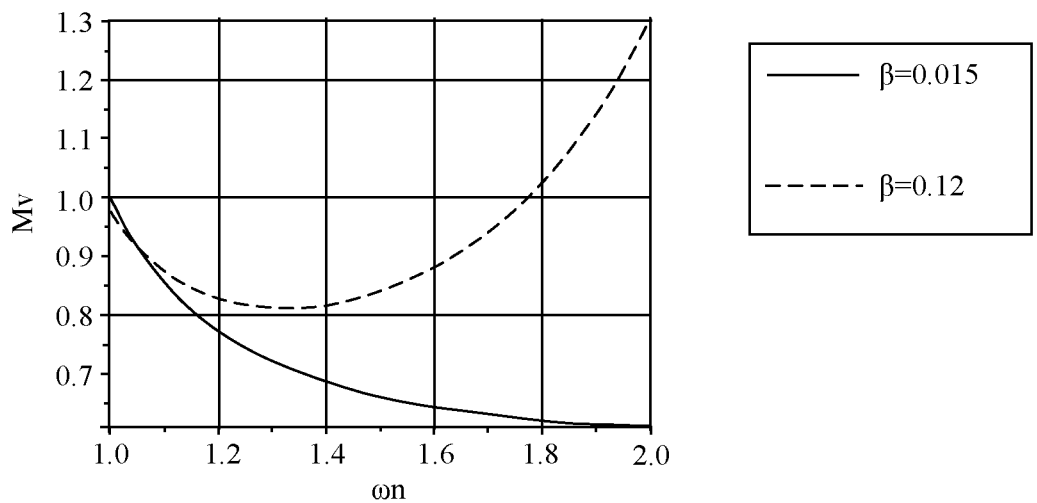
FIG. 13 is a schematic diagram of a voltage gain curve of a wireless charging system according to yet another embodiment of this application.

When the wireless charging system is lightly loaded, for example, fully charged, or a current output by the wireless charging system in a stage in which the electronic device has just established communication (negotiated charging power) is relatively small, assuming that the modulation capacitance ratio β is 0.015 and 0.12 respectively, a voltage gain curve is shown in FIG. 13, where a horizontal axis is the scalarized operating angular frequency ωn, and a vertical axis is the voltage gain Mv. With reference to the previous analysis, Vrect needs to have a valid voltage difference during ASK communication. In FIG. 13, there is a turning point (minimum value ωn=1.3) for the voltage gain. A magnitude of the turning point depends on the coupling factor k. When the modulation capacitance is relatively large (β=0.12), the voltage gain is relatively large (Mv>0.8), and the capacitor C3 is charged during communication, but when the modulation capacitor is disconnected, the voltage gain needs to be reduced to achieve a valid voltage difference of Vrect. However, in a light load state, the load is insufficient, and this causes the voltage of the capacitor C3 to increase continuously, resulting in a distortion of a communication waveform.

Figure 14:
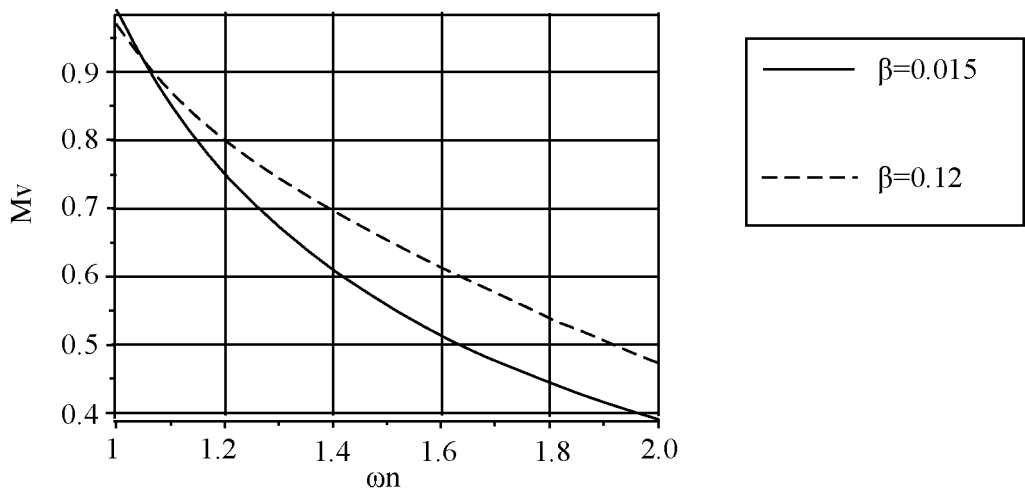
FIG. 14 is a schematic diagram of a voltage gain curve of a wireless charging system according to another embodiment of this application.

When the wireless charging system is fully loaded, assuming that the modulation capacitance ratio β is 0.015 and 0.12 respectively, a voltage gain curve is shown in FIG. 14, where a horizontal axis is the scalarized operating angular frequency ωn, and a vertical axis is the voltage gain Mv. When the wireless charging system is fully loaded, increasing the load reduces the voltage difference of the rectified voltage Vrect during communication, and due to the increase of the load, the operating angular frequency ωn decreases, and this further reduces the voltage difference of the rectified voltage Vrect, resulting in demodulation failure on the transmitting terminal. For example, when ωn=1.6 and β=0.12, Mv≈0.62; when β=0.015, Mv≈0.52, where a voltage gain difference is 0.1. When ωn decreases to 1.2 and β=0.12, Mv≈0.8; when β=0.015, Mv≈0.75, where a voltage gain difference is 0.05. Apparently, after the operating angular frequency ωn decreases, the voltage gain difference decreases, resulting in decrease of the voltage difference of the rectified voltage Vrect. However, as shown in FIG. 14, increasing the modulation capacitance ratio β (that is, increasing the modulation capacitance) helps increase the voltage gain Mv, thereby increasing the voltage difference of the rectified voltage Vrect.

Figure 15:
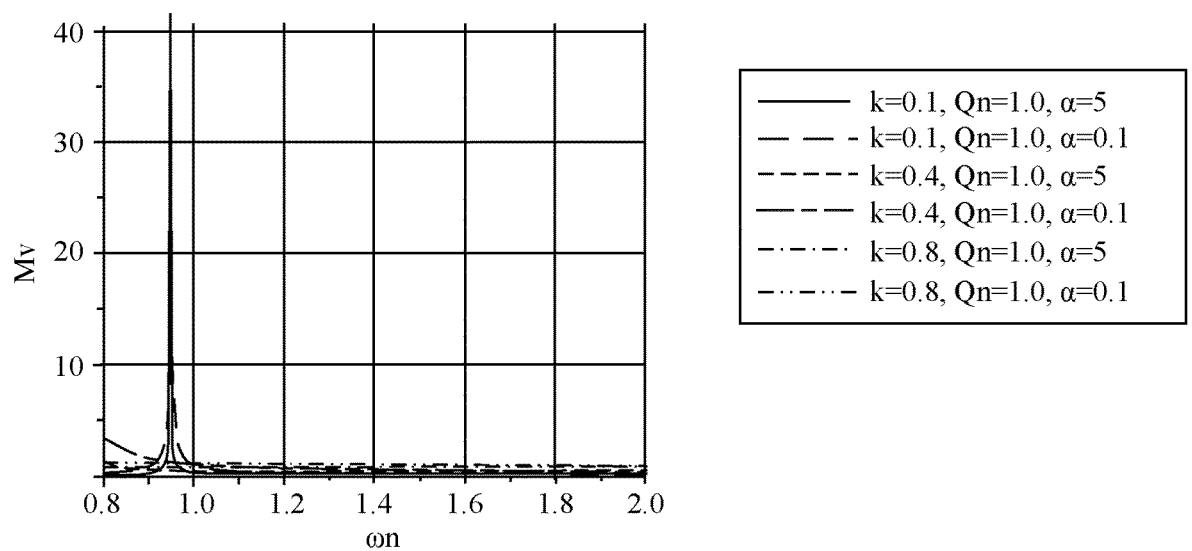
FIG. 15 is a schematic diagram of a voltage gain curve of a wireless charging system according to still another embodiment of this application.
Figure 16:
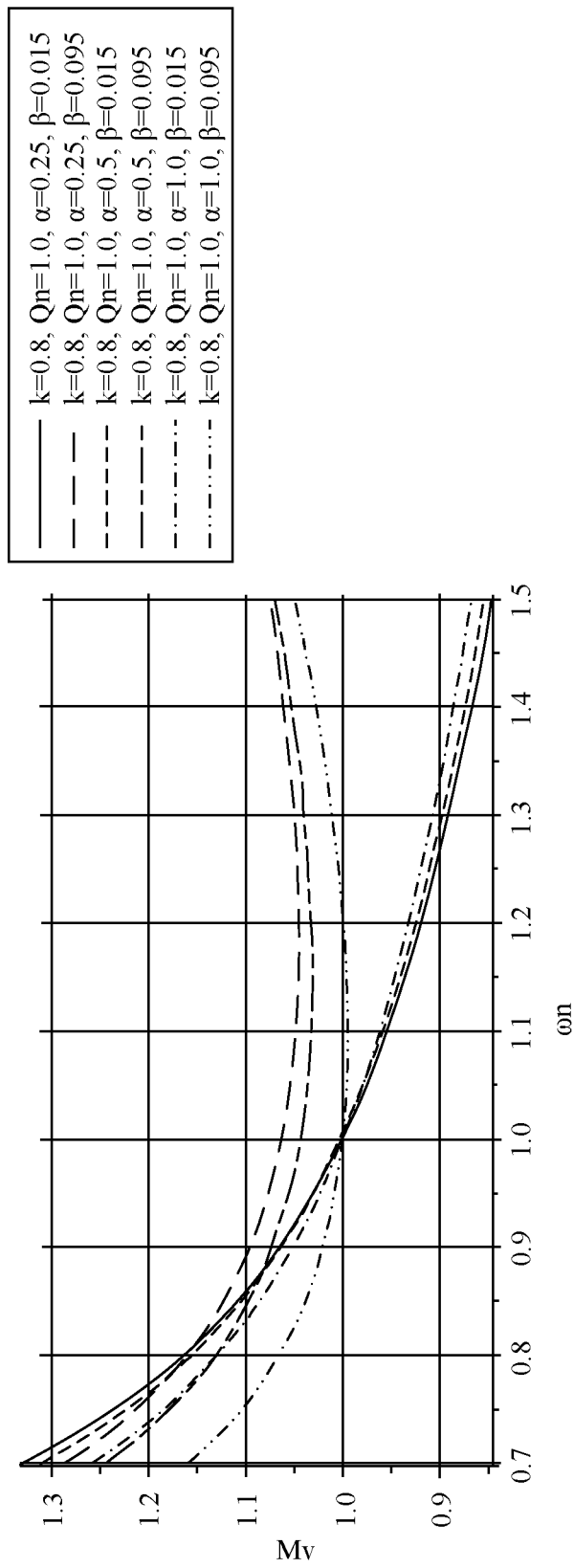
FIG. 16 is a schematic diagram of a voltage gain curve of a wireless charging system according to yet another embodiment of this application.

Using the coil turns ratio n=1, the modulation capacitance ratio β=0.12, and the quality factor Qn=1.0 as an example, a voltage gain curve shown in FIG. 15 is drawn, where a horizontal axis is the scalarized operating angular frequency ωn, and a vertical axis is the voltage gain Mv. The voltage gain Mv is negatively correlated with the coupling factor k and negatively correlated with the resonant capacitance ratio α. When the coupling factor is relatively large, the leakage inductance L1s is relatively small, and the resonant capacitor is overcompensated. In this case, the capacitance value of the resonant capacitor is relatively large, and the resonant capacitance ratio α is relatively small. In this case, when the modulation capacitor is connected, the voltage gain decreases, and when the modulation capacitor is disconnected, the voltage gain increases, resulting in negative ASK modulation. Specifically, with reference to FIG. 16, when the coupling factor k (k=0.8) is relatively large, the leakage inductance L1s becomes small, and therefore the reference angular frequency $$\omega 0 = \frac{1}{\sqrt{L1s * C1}}$$

becomes large; and further, after the reference angular frequency becomes large, the scalarized operating angular frequency ωn becomes small. For example, when k=0.5, the scalarized operating angular frequency ωn is 1.0 to 2.0, and after the coupling factor k (k=0.8) becomes large, the scalarized operating angular frequency is 0.63 to 1.26. An impedance characteristic in normal operation of WPC wireless charging is inductive. After the coupling factor becomes large, critical impedance (capacitive impedance and inductive impedance) occurs in normal operation, and negative ASK modulation occurs in a capacitive impedance region (overcompensation). As shown in FIG. 16, there is an intersection point between the two curves of β=0.015 and β=0.095 (when α=0.25, the intersection point is at wn=0.8; when α=0.5, the intersection point is at wn=0.85; when α=1.0, the intersection point is at wn=1.0). Before the intersection point, because Mv decreases with the increase of β, negative ASK modulation occurs. In actual operation, the coil coupling factor k is related to a charging position of the electronic device. Therefore, when the coupling factor k is relatively low, generally the charging position is relatively biased. When the coupling factor k is relatively high, generally an air gap between coils is insufficient or the charging position is in the middle. Therefore, ASK communication quality is mainly affected by negative ASK modulation caused when the coupling factor is relatively large.

Figure 17:
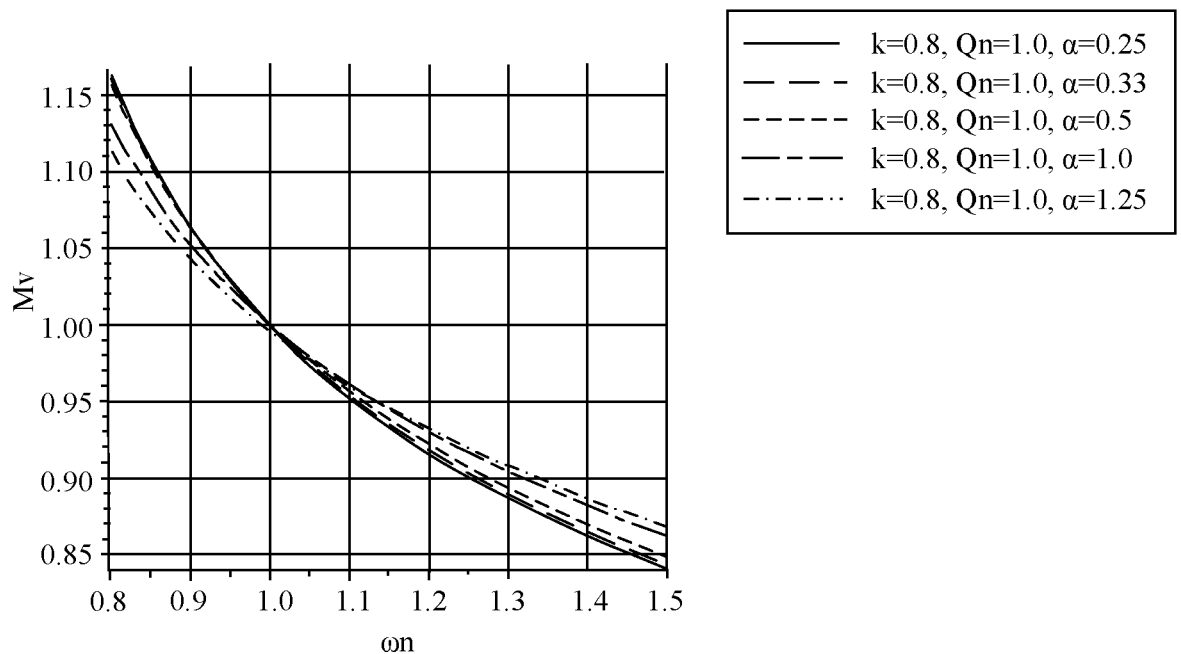
FIG. 17 is a schematic diagram of a voltage gain curve of a wireless charging system according to another embodiment of this application.

With reference to FIG. 17, a voltage gain curve is drawn with the quality factor Qn=1.0 and the relatively high coupling factor k=0.8, where a horizontal axis is the operating angular frequency ωn, and a vertical axis is the voltage gain Mv. The resonant capacitance ratio α is 0.25, 0.33, 0.5, 1.0, and 5 in sequence. In the wireless charging Qi standard, the operating frequency is 100 kHz to 200 kHz. When the coupling factor is 0.8, the scalarized operating angular frequency ωn of the system is below 1.26. For example, when ωn=0.9 and α=1.0, Mv≈1.05; when ωn=0.9 and α=0.25, Mv≈1.07, that is, Mv decreases with the increase of α. Apparently, decreasing the resonant capacitance ratio α can increase the voltage gain, thereby improving the loading capability and enhancing ASK communication quality.

In summary, reasons that affect ASK communication quality and cause relatively poor compatibility of the electronic device are mainly as follows: negative ASK modulation, the communication waveform distortion when the wireless charging system is lightly loaded, and decrease (generally, the voltage difference of the rectified voltage Vrect is decreased more apparently when the wireless charging system is fully loaded) or increase of the voltage difference of the rectified voltage Vrect of the wireless charging system. Based on the foregoing analysis, the solutions provided in embodiments of this application mainly resolve the foregoing problems according to the following principles: The problem of negative ASK modulation can be resolved by optimizing the resonant capacitor C2 or the modulation capacitor of the power receiving terminal electronic device; the problem of the communication waveform distortion when the wireless charging system is lightly loaded can be resolved by optimizing the impedance of the power receiving terminal electronic device; and the problem of decrease or increase of the voltage difference of the rectified voltage Vrect can be resolved by optimizing the equivalent capacitive reactance (for example, the modulation capacitance or the resonant capacitance) of the power receiving terminal electronic device.

Figure 18:
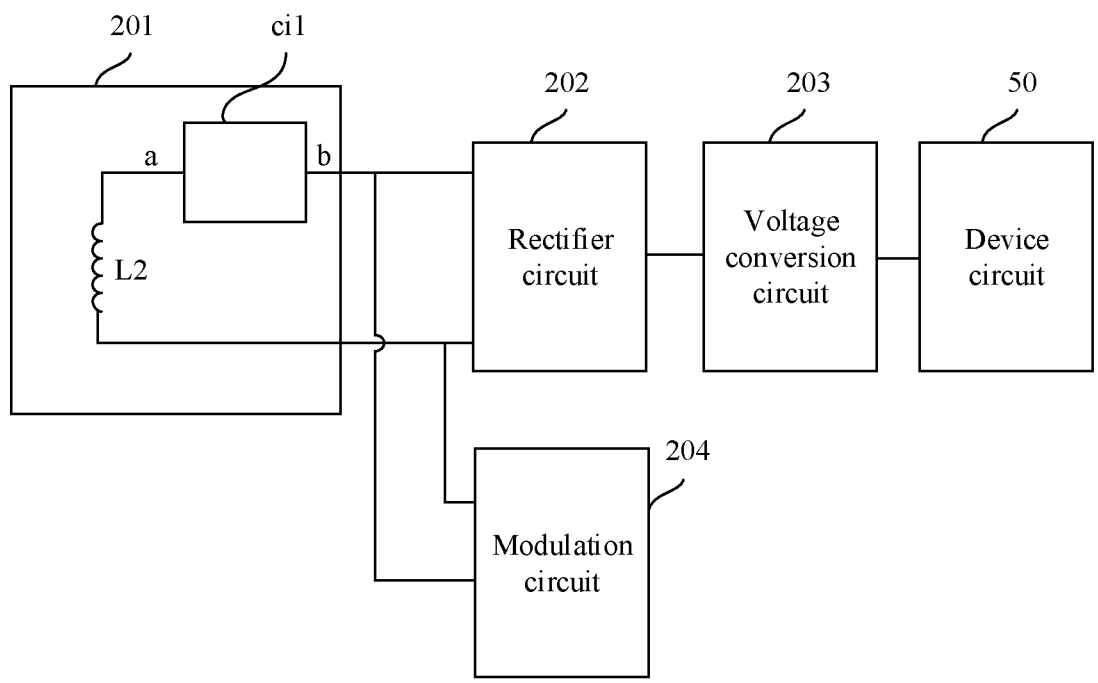
FIG. 18 is a schematic diagram of a structure of an electronic device according to an embodiment of this application.

Based on the foregoing analysis result, an electronic device provided in an embodiment of this application is described in detail as follows:

In an example 1, an embodiment of this application provides an electronic device. As shown in FIG. 18, the electronic device includes a device circuit 50, a voltage conversion circuit 203, a rectifier circuit 202, a resonant circuit 201, and a modulation circuit 204. An input end of the device circuit 50 is coupled to an output end of the voltage conversion circuit 203, an input end of the voltage conversion circuit 203 is coupled to an output end of the rectifier circuit 202, an input end of the rectifier circuit 202 is coupled to an output end of the resonant circuit 201, and the modulation circuit 204 is coupled to the input end of the rectifier circuit 202. The resonant circuit 201 is configured to induce an alternating magnetic field sent by a power transmitting terminal device to generate an induced alternating current; the modulation circuit 204 is configured to modulate an amplitude of the alternating current; the rectifier circuit 202 is configured to rectify the amplitude-modulated induced alternating current to generate a rectified voltage Vrect; and the voltage conversion circuit 203 is configured to convert the rectified voltage into a load voltage and output the load voltage to the device circuit 50.

The resonant circuit 201 includes a resonant inductor L2 and a resonant capacitor control circuit ci1 connected in series to the resonant inductor L2. A first end of the resonant inductor L2 is coupled to the rectifier circuit 202, a second end of the resonant inductor L2 is coupled to a first end a of the resonant capacitor control circuit ci1, and a second end of the resonant capacitor control circuit ci1 is coupled to the rectifier circuit 202. The resonant capacitor control circuit ci1 is configured to adjust a capacitance value of a resonant capacitor coupled to the resonant circuit.

In this example, the resonant capacitor control circuit ci1 can adjust the capacitance value of the resonant capacitor coupled to the resonant circuit. Therefore, with reference to the analysis of FIG. 15, FIG. 16, and FIG. 17, by adjusting the capacitance value of the resonant capacitor, a resonant capacitance ratio α can be adjusted. Because a gain of the rectified voltage can be indirectly adjusted by adjusting the resonant capacitance ratio α, a problem of negative ASK modulation or decrease or increase of a voltage difference of the rectified voltage Vrect is resolved. Therefore, ASK communication quality is improved, and compatibility of the electronic device in wireless charging is improved.

The resonant capacitor control circuit ci1 includes a capacitance value switching network formed by at least one switch and at least one capacitor, and the resonant capacitor control circuit ci1 is configured to control a status of the switch to adjust the capacitance value of the resonant capacitor coupled to the resonant circuit.

Figure 19:
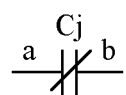
FIG. 19 is a schematic diagram of a structure of a resonant capacitor control circuit according to an embodiment of this application.

Specifically, as shown in FIG. 19, the resonant capacitor control circuit ci1 includes an adjustable capacitor Cj, a first end of the adjustable capacitor Cj is coupled to the second end of the resonant inductor L2, and a second end of the adjustable capacitor Cj is coupled to the rectifier circuit 202. In this way, the capacitance value of the resonant capacitor coupled to the resonant circuit can be adjusted by directly adjusting a capacitance value of the adjustable capacitor Cj.

Figure 20:
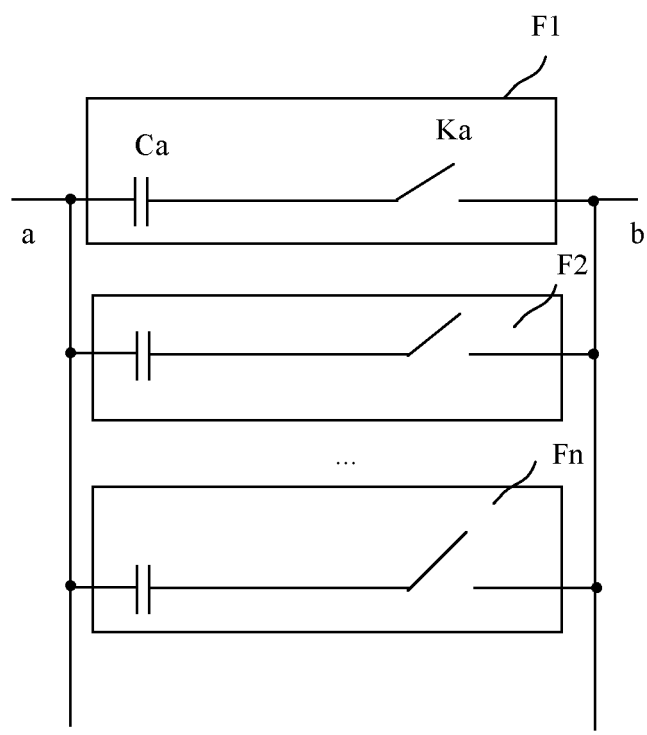
FIG. 20 is a schematic diagram of a structure of a resonant capacitor control circuit according to another embodiment of this application.

As shown in FIG. 20, the resonant capacitor control circuit ci1 includes at least two parallel resonant capacitor regulating branches F (F1 to Fn). A first end of the resonant capacitor regulating branch F1 (F2 to Fn) is coupled to the second end (node a) of the resonant inductor L2, and a second end of the resonant capacitor regulating branch F1 (F2 to Fn) is coupled to the rectifier circuit 202 (node b). A first switch Ka and a first capacitor Ca are connected in series on at least one resonant capacitor regulating branch F1 (F2 to Fn), and the resonant capacitor control circuit ci1 adjusts, by adjusting a status of a first switch Ka on the at least one resonant capacitor regulating branch F1 (F2 to Fn), the capacitance value of the resonant capacitor coupled to the resonant circuit 201. For example, currently, the first switch Ka of the resonant capacitor regulating branch F1 is controlled to be in an on state by default. In this case, the first capacitor Ca on the resonant capacitor regulating branch F1 is used as the resonant capacitor, and the resonant capacitor and the resonant inductor L2 form the resonant circuit to receive power sent by a power transmitting terminal electronic device. When a voltage gain needs to be increased, the first switch Ka of the resonant capacitor regulating branch F2 may be controlled to be in an on state. In this case, a capacitor equivalent to the first capacitor Ca on the resonant capacitor regulating branch F1 and the first capacitor Ca on the resonant capacitor regulating branch F2 that are connected in parallel is used as the resonant capacitor, and the resonant capacitor and the resonant inductor L2 form the resonant circuit to receive power sent by the power transmitting terminal electronic device. Because the capacitance value of the resonant capacitor becomes large, the resonant capacitance ratio is reduced, and the voltage gain is increased. Certainly, first switches Ka of more resonant capacitor regulating branches may alternatively be controlled to be turned on if the voltage gain obtained by connecting two first capacitors in parallel is still insufficient.

Figure 21:
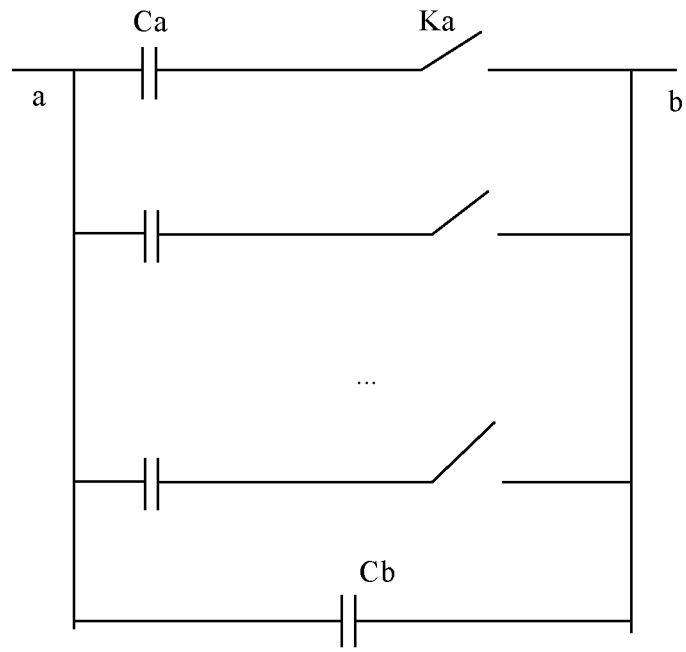
FIG. 21 is a schematic diagram of a structure of a resonant capacitor control circuit according to still another embodiment of this application.

As shown in FIG. 21, one resonant capacitor regulating branch F1 (F2 to Fn) includes a second capacitor Cb, a first end of the second capacitor Cb is coupled to the second end of the resonant inductor L2, and a second end of the second capacitor Cb is coupled to the rectifier circuit 202. A control principle of the second capacitor Cb is the same as the control of any resonant capacitor regulating branch shown in FIG. 21. In an initial state, the second capacitor Cb is used as the resonant capacitor, and the resonant capacitor and the resonant inductor L2 form the resonant circuit to receive power sent by the power transmitting terminal electronic device. When the voltage gain needs to be increased, the first switch Ka of the resonant capacitor regulating branch F1 may be controlled to be in the on state. In this case, a capacitor equivalent to the second capacitor Cb and the first capacitor Ca on the resonant capacitor regulating branch F1 that are connected in parallel is used as the resonant capacitor, and the resonant capacitor and the resonant inductor L2 form the resonant circuit to receive power sent by the power transmitting terminal electronic device. Because the capacitance value of the resonant capacitor becomes large, the resonant capacitance ratio is reduced, and the voltage gain becomes large.

For example, the first switch Ka may be a bidirectional switch, and a current flowing in the resonant circuit 201 is in a form of an alternating current. Therefore, the current needs to be conducted from a to b or from b to a. Therefore, the first switch needs to have a bidirectional conduction function. Specifically, the bidirectional switch may be a reverse series switching transistor. Because the switching transistor generally has a unidirectional conduction characteristic, a bidirectional conduction effect needs to be achieved by using two reverse series switching transistors. Specifically, in some embodiments of this application, the switching transistor has a gate (gate, g) and a first electrode, for example, a drain (drain, d), and a second electrode, for example, a source (source, s). In this embodiment of this application, the switching transistor may be an N-type switching transistor or a P-type switching transistor. Using FIG. 22 as an example, the first switch K1 includes a switching transistor Qs1 and a switching transistor Qs2. Using the N-type switching transistor as an example, a drain (drain, d) of Qs1 is connected to a drain d of Qs2, a source (source, s) of Qs1 is connected to the node a through the first capacitor Ca, and a source s of Qs2 is connected to the node b. Gates (gate, g) of Qs1 and Qs2, as gating ends of the first switch 31, are configured to receive gating signals. In some embodiments of this application, the electronic device may include a gating control circuit 207 and a drive circuit 206 shown in FIG. 22, where the gating control circuit 207 is configured to generate a logic signal, and the drive circuit 206 may convert the logic signal into a voltage signal and provide the voltage signal as a gating signal to the gates g of Qs1 and Qs2 to control turn-on or turn-off of Qs1 and Qs2. When the N-type switching transistor is turned on, a direction of a current is from d to s (an anode (anode, a) of a parasitic diode D1 is coupled to the source s of Qs1, a cathode (cathode, c) of the parasitic diode D1 is coupled to the drain d of Qs1, and a parasitic diode D2 in Qs2 is connected in the same way as the parasitic diode D1 in Qs1). Using Qs1 as an example, a conduction direction of the parasitic capacitor D1 in a freewheeling function is from s to d. Therefore, if the first switch K includes one switching transistor, a current in the direction from s to d cannot be cut off when the switching transistor is in an off state. In this solution, when Qs1 and Qs2 are turned on at the same time, a current from the node a to the node b can pass through the parasitic diode of Qs1 and the drain d and source s of Qs2 in sequence; and a current from the node b to the node a can pass through the parasitic diode of Qs2 and the drain d and source s of Qs1 in sequence.

Because the resonant capacitor is connected in series in the resonant circuit, during power transmission, main power is transmitted by using the resonant capacitor. Therefore, adjusting the resonant capacitor causes system instability. Therefore, capacitive reactance of ASK modulation is usually not optimized by adjusting the resonant capacitor. However, when negative ASK modulation occurs, ASK communication fails directly. Therefore, in this application, the resonant capacitor is mainly adjusted during negative ASK modulation. With reference to the foregoing analysis of FIG. 16, a main cause of negative ASK modulation is that the resonant capacitor is overcompensated. When negative ASK modulation of the rectified voltage Vrect occurs, the resonant capacitor control circuit ci1 is configured to increase the capacitance value of the resonant capacitor coupled to the resonant circuit, to recover positive ASK modulation of the rectified voltage. Specific reasons are analyzed as follows: With reference to FIG. 16, the coupling factor k becomes large, the leakage inductance L1s becomes small, and therefore the reference angular frequency $$\omega 0 = \frac{1}{\sqrt{L1s * C1}}$$

becomes large; and further, after the reference angular frequency becomes large, the scalarized operating angular frequency becomes small. For example, the scalarized operating angular frequency is 1.0 to 2.0, and after the coupling factor k becomes large, the scalarized operating angular frequency is 0.63 to 1.26. An impedance characteristic in normal operation of WPC wireless charging is inductive. After the coupling factor becomes large, critical impedance (capacitive impedance and inductive impedance) occurs in normal operation, and negative modulation occurs in a capacitive impedance region (overcompensation). The resonant capacitor C2 of the power receiving terminal device is increased, the reference angular frequency $$\omega 0 = \frac{1}{\sqrt{L1s * C1}}$$

remains unchanged, and the scalarized operating angular frequency also remains unchanged. However, after the resonant capacitor C2 of the power receiving terminal device is increased, that is, after the resonant capacitance ratio α is reduced, capacitive impedance moves toward a smaller scalarized operating angular frequency, to achieve an objective of changing negative ASK modulation to positive ASK modulation, that is, when α decreases, the intersection point moves rightward.

Figure 23:
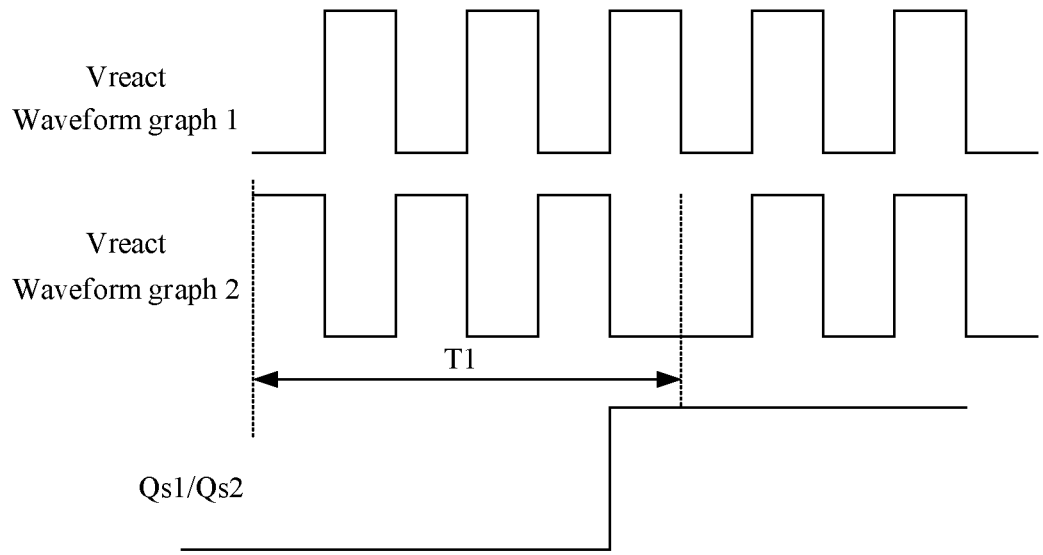
FIG. 23 is a waveform graph of Vrect according to an embodiment of this application.

As shown in FIG. 23, a waveform graph of Vrect when the electronic device is in positive ASK modulation is shown by a waveform graph 1, and a waveform graph when the electronic device is in negative ASK modulation is shown by a stage T1 in a waveform graph 2, where a phase difference between the waveform graph of Vrect during negative ASK modulation and the waveform graph of Vrect during negative ASK modulation is 180°. In this case, the device circuit 50 can detect the rectified voltage Vrect. When negative modulation of the rectified voltage occurs, the resonant capacitor control circuit ci1 increases the capacitance value of the resonant capacitor coupled to the resonant circuit 201, to recover positive modulation of the rectified voltage.

For example, with reference to FIG. 19, when negative ASK modulation occurs, the capacitance value of the adjustable capacitor Cj may be increased, so that the resonant capacitance ratio α is reduced and that negative ASK modulation is corrected to positive ASK modulation. For another example, with reference to FIG. 20, currently, the first switch Ka of the resonant capacitor regulating branch F1 is controlled to be in the on state by default. In this case, the first capacitor Ca on the resonant capacitor regulating branch F1 is used as the resonant capacitor, and the resonant capacitor and the resonant inductor L2 form the resonant circuit to receive power sent by the power transmitting terminal electronic device. When the voltage gain needs to be increased, the first switch Ka of the resonant capacitor regulating branch F2 may be controlled to be in the on state. In this case, the capacitor equivalent to the first capacitor Ca on the resonant capacitor regulating branch F1 and the first capacitor Ca on the resonant capacitor regulating branch F2 that are connected in parallel is used as the resonant capacitor, and the resonant capacitor and the resonant inductor L2 form the resonant circuit to receive power sent by the power transmitting terminal electronic device. Because the capacitance value of the resonant capacitor becomes large, the resonant capacitance ratio α is reduced, and negative ASK modulation is corrected to positive ASK modulation. Certainly, first switches Ka of more resonant capacitor regulating branches may alternatively be controlled to be turned on if two first capacitors connected in parallel are insufficient for correcting negative ASK modulation to positive ASK modulation. With reference to FIG. 23, a sequence of the gating signals of Qs1 and Qs2 is also provided. When negative modulation of the rectified voltage occurs in the stage T1, an objective of increasing the capacitance value of the resonant capacitor is achieved by inputting the gating signals of the sequence at the gates g of Qs1 and Qs2 of one or more resonant capacitor regulating branches.

Figure 24:
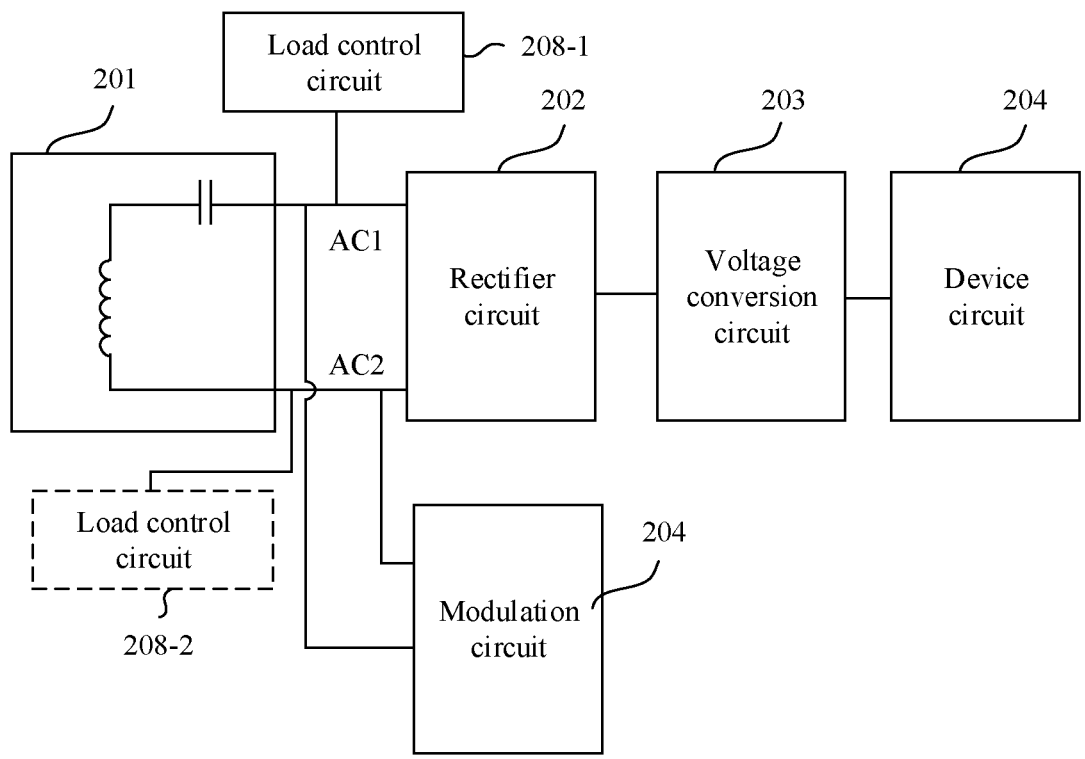
FIG. 24 is a schematic diagram of a structure of an electronic device according to another embodiment of this application.

In an example 2, as shown in FIG. 24, an electronic device is provided and includes a device circuit 50, a voltage conversion circuit 203, a rectifier circuit 202, a resonant circuit 201, and a modulation circuit 204. An input end of the device circuit 50 is coupled to an output end of the voltage conversion circuit 203, an input end of the voltage conversion circuit 203 is coupled to an output end of the rectifier circuit 202, an input end of the rectifier circuit 202 is coupled to an output end of the resonant circuit 201, and the modulation circuit 204 is coupled to the input end of the rectifier circuit 202. The resonant circuit 201 is configured to induce an alternating magnetic field sent by a power transmitting terminal device to generate an induced alternating current; the modulation circuit 204 is configured to modulate an amplitude of the alternating current; the rectifier circuit is configured to rectify the amplitude-modulated induced alternating current to generate a rectified voltage; and the voltage conversion circuit 203 is configured to convert the rectified voltage into a load voltage and output the load voltage to the device circuit 50. The electronic device further includes a load control circuit 208. The load control circuit 208 is coupled to the input end of the rectifier circuit 202, and the load control circuit 208 is configured to connect a resistance value to the input end of the rectifier circuit 202 when the rectified voltage is at a low level.

In this example, because the load control circuit is coupled to the input end of the rectifier circuit, the load control circuit 2 can connect the resistance value to the input end of the rectifier circuit when the rectified voltage is at the low level. Based on the analysis of FIG. 13, a modulation capacitor is disconnected when the rectified voltage is at the low level. In this case, a voltage gain needs to be reduced. Because the resistance value is connected to the input end of the rectifier circuit, energy of the input end of the rectifier circuit can be forcibly released when the modulation capacitor is disconnected. In this way, continuous increase of a voltage of a capacitor C3 is avoided, and a modulation waveform is improved by dividing the rectified voltage. For example, low level burrs or oscillations are eliminated.

The load control circuit 208 includes a resistance value switching network formed by at least one switch and at least one resistor, and the load control circuit 208 is configured to control a status of the switch to adjust the resistance value connected to the input end of the rectifier circuit.

In addition, the device circuit 50 is further configured to detect power Pout corresponding to the rectified voltage Vrect and power Pri consumed by the resistance value connected by the load control circuit 208 to the input end of the rectifier circuit; and the load control circuit 208 is configured to disconnect the resistance value when it is determined that the power Pout corresponding to the rectified voltage is greater than the power Pri consumed by the resistance value.

Figure 25:
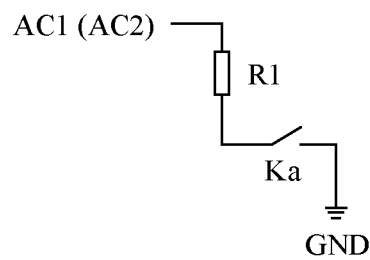
FIG. 25 is a schematic diagram of a structure of a load control circuit according to an embodiment of this application.

Because the solution provided in this embodiment of this application is based on a differential biphase coding scheme in which the rectifier circuit 202 includes two input ends AC1 and AC2 as shown in FIG. 4, in this embodiment of this application, two load control circuits 208 (208-1 and 208-2) are included, as shown in FIG. 24, where the load control circuit 208-1 is connected to the input end AC1 of the rectifier circuit 202 and the load control circuit 208-2 is connected to the input end AC2 of the rectifier circuit 202. Structures of the load control circuits connected to the two input ends AC1 and AC2 are the same. As shown in FIG. 25, a schematic diagram of a load control circuit 208 is provided. The load control circuit 208 includes a first switch Ka and a first resistor R1, a first end of the first resistor R1 is coupled to the input end AC1 (or AC2) of the rectifier circuit 202, a second end of the first resistor R1 is coupled to a first end of the first switch Ka, and a second end of the first switch Ka is grounded GND.

Figure 26A:
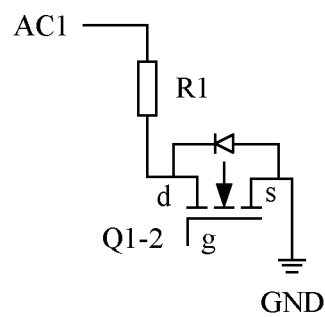
FIG. 26a is a schematic diagram of a structure of a load control circuit according to another embodiment of this application.
Figure 26B:
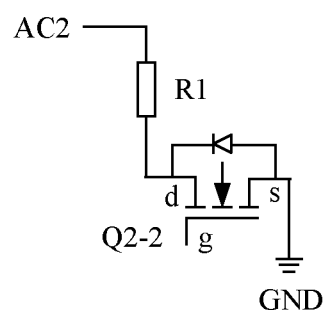
FIG. 26b is a schematic diagram of a structure of a load control circuit according to still another embodiment of this application.

As shown in FIG. 26a, the first switch Ka includes a switching transistor Q1-2. As described above, the switching transistor Q1-2 may include an N-type switching transistor or a P-type switching transistor. It can be learned from the foregoing description that when the N-type switching transistor is turned on, a direction of a current is from a drain d to a source s, and the current needs to be released to the GND through a resistor. Therefore, when the N-type switching transistor is used, the source s of the switching transistor can be directly grounded, so that floating of the source of the switching transistor is avoided. For example, the source s of the switching transistor is grounded GND. In this way, when the N-type switching transistor is used, the source s has a fixed value, and the N-type switching transistor can be turned on as long as a voltage of a gate g is higher than a voltage of the source s. The circuit design is relatively simple. When other manners are used, for example, when the P-type switching transistor is used, when the P-type switching transistor is turned on, a direction of a current is from a source s to a drain d, and the current needs to be released to the GND through a resistor. Therefore, the drain d is grounded GND. However, a voltage of the source s is not fixed, and a voltage of a gate g that controls turn-on of the P-type switching transistor cannot be determined. This is because a ground voltage of the source s has two states. When the P-type switching transistor is turned off, the voltage is at a low level, and when the P-type switching transistor is turned on, the voltage is close to that of AC1. Therefore, when the first switch Ka is the P-type switching transistor, an isolated power control or bootstrap boost circuit needs to be separately designed to provide a gating signal for the P-type switching transistor. The load control circuit 208-1 connected to AC1 is described above. FIG. 26b also shows that a first switch K in the load control circuit 208-2 connected to AC2 may include a switching transistor Q2-2 whose connection mode is similar to that of the switching transistor Q1-2 and is not described.

Figure 27:
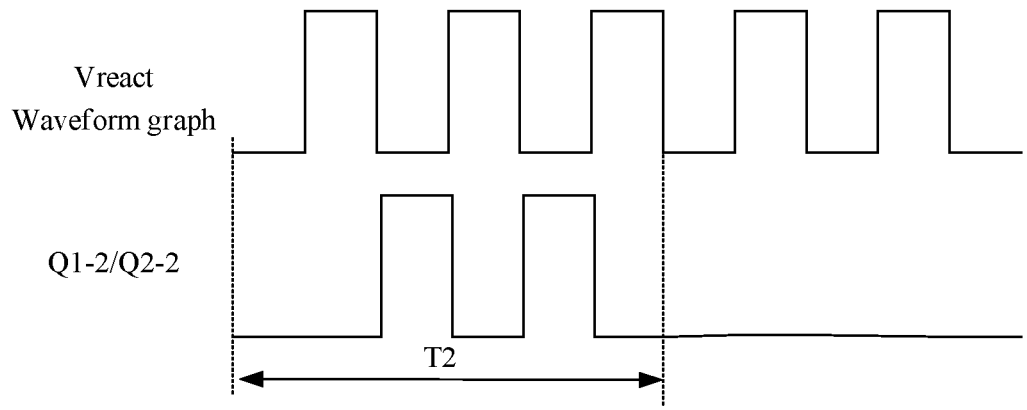
FIG. 27 is a sequence diagram of a Q1-2 (Q2-2) gating signal according to an embodiment of this application.

As shown in FIG. 27, a sequence diagram of a gating signal of Q1-2 (Q2-2) is provided. For example, in an establishment stage of power transmission of the electronic device, when the electronic device is in a light load state, when Vrect is at the low level, the first switch Ka of the load control circuit 208 is turned on (when the switching transistor Q1-2 (Q2-2) is used, the switching transistor Q1-2 (Q2-2) is controlled to be turned on by using a gating signal), and the first resistor is connected to the input end AC1 (AC2) of the rectifier circuit 202. In this case, after ASK communication is completed, the device circuit 50 detects power Pout (Vout*Iout, where Vout is an output voltage of an LDO, and Iout is an output current of the LDO) corresponding to the rectified voltage Vrect and power Pri consumed by the first resistor connected by the load control circuit 208 to the input end of the rectifier circuit. As shown in FIG. 27, when it is detected that Pout is greater than Pri after a time T2, the first switch Ka is turned off (when the switching transistor Q1-2 (Q2-2) is used, the switching transistor Q1-2 (Q2-2) is controlled to be turned off by using a gating signal. For details about controlling the status of the switching transistor by using the gating signal, refer to the description in the example 1. Details are not described herein again).

Figure 28:
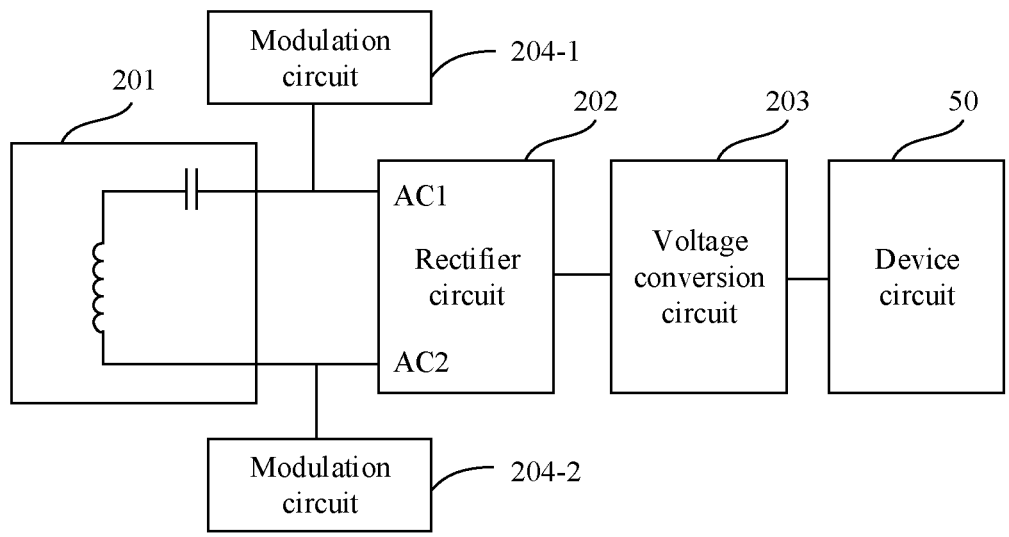
FIG. 28 is a schematic diagram of a structure of an electronic device according to still another embodiment of this application.

In an example 3, as shown in FIG. 28, an electronic device is provided and includes a device circuit 50, a voltage conversion circuit 203, a rectifier circuit 202, a resonant circuit 201, and a modulation circuit 204. An input end of the device circuit 50 is coupled to an output end of the voltage conversion circuit 203, an input end of the voltage conversion circuit 203 is coupled to an output end of the rectifier circuit 202, an input end of the rectifier circuit 202 is coupled to an output end of the resonant circuit 201, and the modulation circuit 204 is coupled to the input end of the rectifier circuit 202. The resonant circuit 201 is configured to induce an alternating magnetic field sent by a power transmitting terminal device to generate an induced alternating current; the modulation circuit 204 is configured to modulate an amplitude of the alternating current; the rectifier circuit 202 is configured to rectify the amplitude-modulated induced alternating current to generate a rectified voltage Vrect; and the voltage conversion circuit is configured to convert the rectified voltage into a load voltage and output the load voltage to the device circuit 50.

The modulation circuit 204 is configured to adjust a capacitance value of a modulation capacitor connected to the input end of the rectifier circuit 202.

Because the solution provided in this embodiment of this application is based on a differential biphase coding scheme in which the rectifier circuit 202 includes two input ends AC1 and AC2 as shown in FIG. 4, in this embodiment of this application, two modulation circuits 204 (204-1 and 204-2) are included, as shown in FIG. 28, where the modulation circuit 204-1 is connected to the input end AC1 of the rectifier circuit 202 and the modulation circuit 204-2 is connected to the input end AC2 of the rectifier circuit 202. Structures of the modulation circuits connected to the two input ends AC1 and AC2 are the same. Certainly, the two modulation circuits 204-1 and 204-2 may be integrated into one modulation circuit, as shown in FIG. 4.

With the analysis of FIG. 10, FIG. 11, FIG. 12, FIG. 13, and FIG. 14, because the modulation circuit can adjust the capacitance value of the modulation capacitor connected to the input end of the rectifier circuit, a value of a modulation capacitance ratio can be adjusted. Because a gain of the rectified voltage can be indirectly adjusted by adjusting the value of the modulation capacitance ratio, a problem of negative ASK modulation or decrease or increase of a voltage difference of the rectified voltage Vrect is resolved. Therefore, ASK communication quality is improved, and compatibility of the electronic device in wireless charging is improved.

The modulation circuit includes a capacitance value switching network formed by at least one switch and at least one capacitor, and the modulation circuit is configured to control a status of the switch to adjust the capacitance value of the modulation capacitor connected to the input end of the rectifier circuit.

Figure 29:
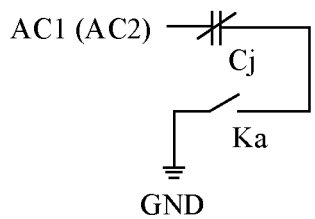
FIG. 29 is a schematic diagram of a structure of a modulation circuit according to an embodiment of this application.
Figure 30:
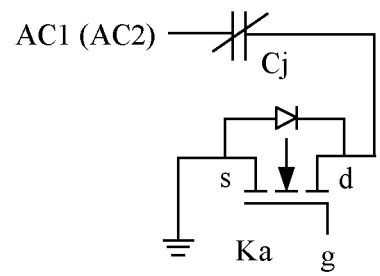
FIG. 30 is a schematic diagram of a structure of a modulation circuit according to another embodiment of this application.

Specifically, as shown in FIG. 29, the modulation circuit 204 includes a first switch Ka and an adjustable capacitor Cj, a first end of the adjustable capacitor Cj is coupled to the input end AC1 (AC2) of the rectifier circuit 202, a second end of the adjustable capacitor Ci is coupled to a first end of the first switch Ka, and a second end of the first switch Ka is coupled to the ground GND. The first switch Ka may be a switching transistor Q1-1, such as an N-type switching transistor or a P-type switching transistor. As shown in FIG. 30, because the second end of the first switch Ka is coupled to the ground GND, the N-type switching transistor may be preferably used as the first switch Ka, as described above.

Figure 31:
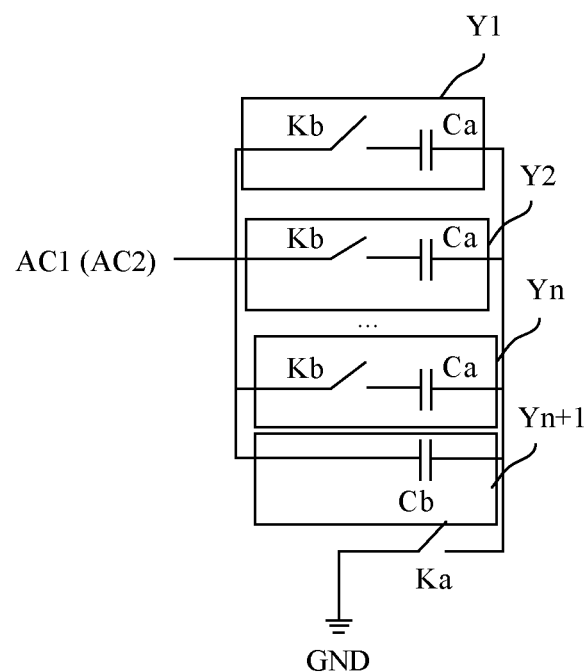
FIG. 31 is a schematic diagram of a structure of a modulation circuit according to still another embodiment of this application.

For example, as shown in FIG. 31, the modulation circuit 204 includes a first switch Ka and at least two parallel modulation capacitor branches Y (Y1 to Yn), a first end of the modulation capacitor branch Y (Y1 to Yn) is coupled to the input end AC1 of the rectifier circuit 202, a second end of the modulation capacitor branch Y (Y1 to Yn) is coupled to a first end of the first switch Ka, and a second end of the first switch Ka is coupled to the ground GND. Any modulation capacitor branch Y (Y1 to Yn) includes a first capacitor Ca and a second switch Kb, a first end of the second switch Kb is coupled to the input end of the rectifier circuit 202, a second end of the second switch Kb is coupled to a first end of the first capacitor Ca, and a second end of the first capacitor Ca is coupled to the first end of the first switch Ka. The modulation circuit 204 adjusts, by adjusting a status of the second switch Kb on the at least one modulation capacitor branch Y (Y1 to Yn), the capacitance value of the modulation capacitor connected to the input end of the rectifier circuit 204. For example, currently, the second switch Kb of the modulation capacitor branch Y1 is controlled to be in an on state by default, and a voltage gain needs to be increased. In this case, the second switch Kb of the modulation capacitor branch Y2 is controlled to be in an on state. In this case, when the first switch Ka is turned on, the modulation capacitor connected to the input end AC1 (AC2) of the rectifier circuit 202 is a capacitor equivalent to the first capacitor Ca on the modulation capacitor branch Y1 and the first capacitor Ca on Y2 that are connected in parallel. If the voltage gain needs to be increased, the second switch Kb of the modulation capacitor branch Y3 continues to be controlled to be in an on state. In this way, the modulation capacitor connected to the input end AC1 (AC2) of the rectifier circuit 202 is a resistor equivalent to three first capacitors Ca on the modulation capacitor branches Y1, Y2, and Y3 that are connected in parallel, thereby increasing the capacitance value of the modulation capacitor connected to the input end of the rectifier circuit 204. If the voltage gain needs to be decreased, the second switch Kb of the modulation capacitor branch Y3 can be controlled to be in an off state, to reduce the capacitance value of the modulation capacitor connected to the input end of the rectifier circuit 204. Certainly, the foregoing is merely an example, and it is also possible to select to control two or more modulation capacitor branches Y at the same time based on an actual situation. This is not specifically limited in this application.

Figure 32A:
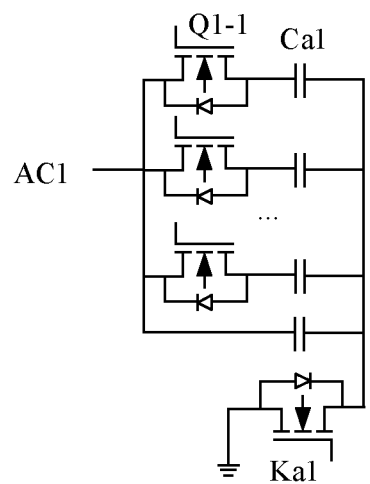
FIG. 32a is a schematic diagram of a structure of a modulation circuit according to yet another embodiment of this application.
Figure 32B:
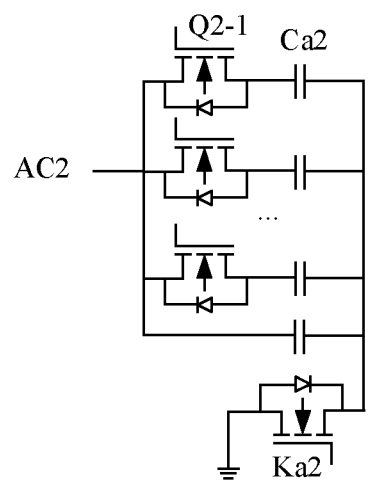
FIG. 32b is a schematic diagram of a structure of a modulation circuit according to another embodiment of this application.

In addition, as shown in FIG. 31, a second capacitor Cb is connected in series on any modulation capacitor branch Y. In this way, Cb is equivalent to Cm1 (Cm2) in FIG. 5. A control principle of the second capacitor Cb is the same as the control of any modulation capacitor branch Y shown in FIG. 31. In an initial state, the second capacitor Cb is used as the modulation capacitor to connect to the input end AC1 (AC2) of the rectifier circuit 202. When the voltage gain needs to be increased, the second switch Kb on any modulation capacitor branch Y is controlled to be turned on. When the voltage gain needs to be reduced, the second switch Kb currently in the on state on any modulation capacitor branch Y is controlled to be turned off. In the example 3, as shown in FIG. 32a, the second switch Kb in the modulation circuit 204-1 may be a switching transistor Q1-1, where a first capacitor Ca (Ca1) and a first switch Ka (Ka1) are also shown in FIG. 32a. As shown in FIG. 32b, the second switch Kb in the modulation circuit 204-2 may be a switching transistor Q2-1, where a first capacitor Ca (Ca2) and a first switch Ka (Ka2) are also shown in FIG. 32b. The switching transistor Q1-1 and the switching transistor Q2-1 may be N-type switching transistors or P-type switching transistors. For details about controlling a status of a switching transistor by using a gating signal, refer to the description in the example 1. Details are not described herein again.

As described in the foregoing example 1, because the resonant capacitor is connected in series in the resonant circuit, during power transmission, main power is transmitted by using the resonant capacitor. Therefore, adjusting the resonant capacitor causes system instability. Therefore, capacitive reactance of ASK modulation is usually not optimized by adjusting the resonant capacitor. However, when negative ASK modulation occurs, ASK communication fails directly. Therefore, in this application, the resonant capacitor is mainly adjusted during negative ASK modulation. With reference to the analysis of FIG. 15, a main cause of negative ASK modulation is that the resonant capacitor is overcompensated. Although adjusting the resonant capacitor can also optimize the voltage difference of Vrect, considering impact of the adjustment on system stability, the voltage difference of the rectified voltage Vrect is mainly optimized by adjusting the modulation capacitor in this embodiment of this application.

For example, when the voltage difference of the rectified voltage Vrect is relatively small due to abnormal ASK modulation when the electronic device is in a full load or heavy load state, or the voltage difference of the rectified voltage Vrect is excessively large and affects communication quality, the voltage difference of the rectified voltage Vrect can be restored to a normal range by adjusting the modulation capacitor. The device circuit 50 is further configured to detect the rectified voltage; and when a maximum voltage difference δVrect of the rectified voltage is less than or equal to a first threshold voltage Vset-th1 and the rectified voltage is at the low level, the modulation circuit 204 is configured to increase the capacitance value of the modulation capacitor connected to the input end of the rectifier circuit; or when a maximum voltage difference of the rectified voltage is greater than or equal to a second threshold voltage Vset-th2 and the rectified voltage is at the low level, the modulation circuit is configured to reduce the capacitance value of the modulation capacitor connected to the input end of the rectifier circuit, where Vset-th2 is greater than Vset-th1. With reference to the description of FIG. 5, when the modulation capacitor is connected to the rectifier circuit, an amplitude of Vrect is increased, that is, corresponding to the high level of the modulation waveform in FIG. 5. When the modulation capacitor is disconnected from the rectifier circuit, the amplitude of Vrect is reduced, that is, corresponding to the low level of the modulation waveform in FIG. 5. Therefore, by referring to the Qi specification, the vset-th1 can determine a smallest value of Vrect that does not affect ASK communication quality. When the maximum voltage difference δVrect is less than or equal to the first threshold voltage Vset-th1, and the rectified voltage is at the low level, the capacitance value of the modulation capacitor connected to the input end of the rectifier circuit is increased. By referring to the Q profile, the Vset-th2 can determine a largest value of δVrect that does not affect ASK communication quality. When the maximum voltage difference δVrect is greater than or equal to the Vset-th2, and the rectified voltage is at the low level, the capacitance value of the modulation capacitor connected to the input end of the rectifier circuit is increased. Because the capacitance value of the modulation capacitor is increased, when the modulation waveform is at the high level, the amplitude of Vrect is higher, so that δVrect is increased. Conversely, if the capacitance value of the modulation capacitor is decreased, when the modulation waveform is at the high level, the amplitude of Vrect is reduced, so that δVrect is decreased.

Figure 33:
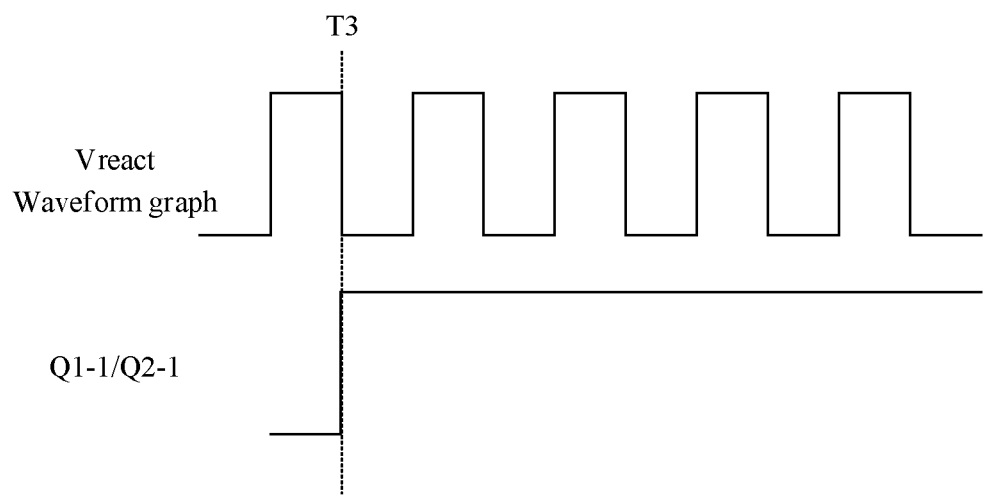
FIG. 33 is a waveform graph of a gating signal of Q1-1 (Q2-1) according to an embodiment of this application.

For example, with reference to FIG. 29 and FIG. 30, when δVrect≤Vset-th1, the capacitance value of the adjustable capacitor Cj can be increased, and when δVrect≥Vset-th2, the capacitance value of the adjustable capacitor Cj can be decreased. With reference to FIG. 31, currently, the second switch Kb of the modulation capacitor branch Y1 is controlled to be in the on state by default. When δVrect≤Vset-th1, the second switch Kb of the modulation capacitor branch Y2 is controlled to be in the on state. In this case, when the first switch Ka is turned on, the modulation capacitor connected to the input end AC1 (AC2) of the rectifier circuit 202 is a capacitor equivalent to the first capacitor Ca on the modulation capacitor branch Y1 and the first capacitor Ca on Y2 that are connected in parallel. If δVrect≤Vset-th1, the second switch Kb of the modulation capacitor branch Y3 continues to be controlled to be in the on state. In this way, the modulation capacitor connected to the input end AC1 (AC2) of the rectifier circuit 202 is a resistor equivalent to three first capacitors Ca on the modulation capacitor branches Y1, Y2, and Y3 that are connected in parallel, thereby increasing the capacitance value of the modulation capacitor connected to the input end of the rectifier circuit 204. If δVrect≥Vset-th2, the second switch Kb of the modulation capacitor branch Y3 can be controlled to be in the off state, to reduce the capacitance value of the modulation capacitor connected to the input end of the rectifier circuit 204. Certainly, the foregoing is merely an example, and it is also possible to select to control two or more modulation capacitor branches Y at the same time based on an actual value of δVrect. This is not specifically limited in this application. As shown in FIG. 33, a waveform graph of a gating signal when Q1-1 (Q2-1) is an N-type switching transistor is also provided. When δVrect≤Vset-th1 is detected before a time T3, Q1-1 on at least one modulation capacitor branch Y is controlled to be turned on when the rectified voltage Vrect is at the low level after T3, to increase the capacitance value of the modulation capacitor.

Figure 34A:
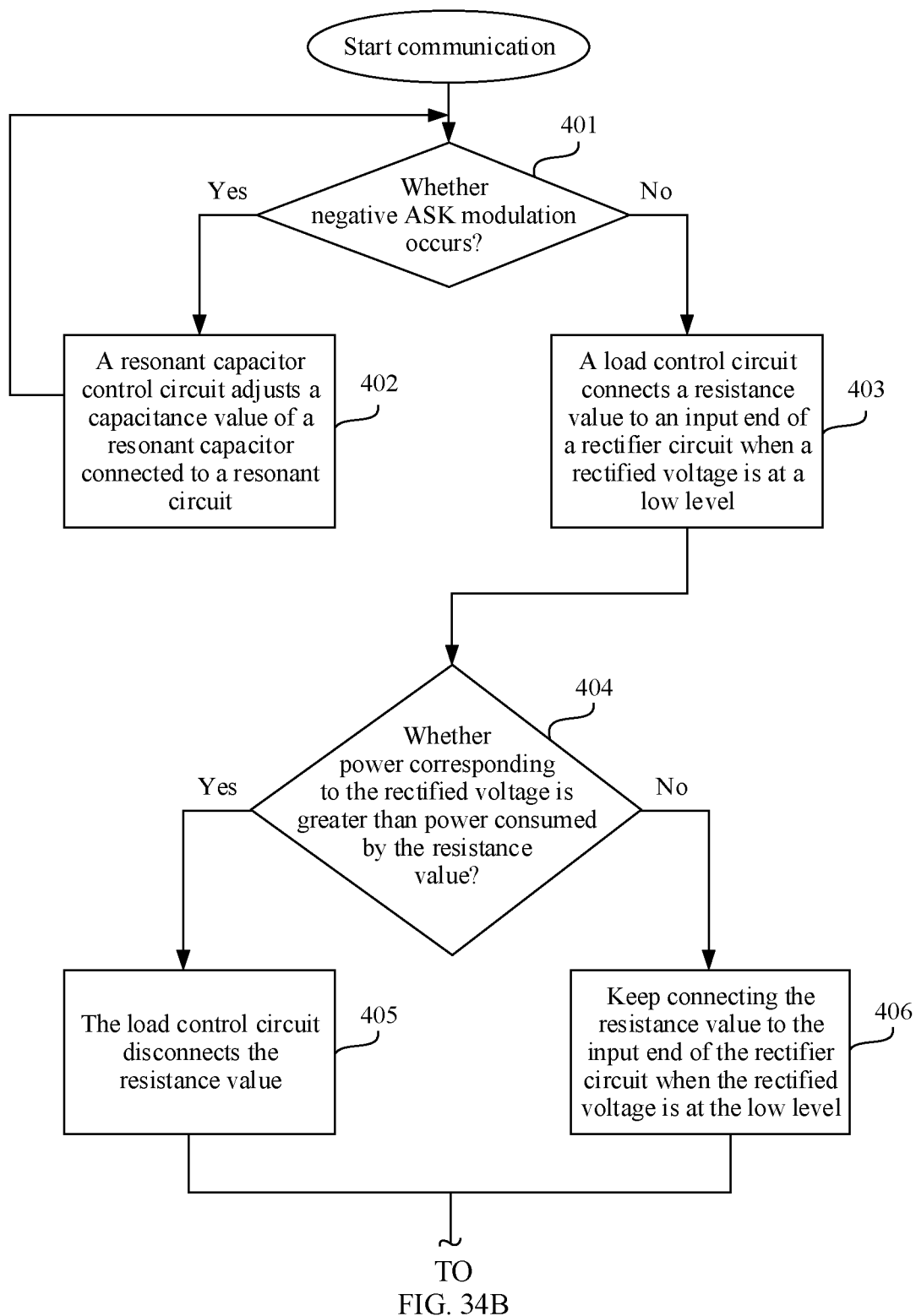
FIG. 34A and FIG. 34B are a schematic flowchart of a control method for an electronic device according to an embodiment of this application.
Figure 34B:
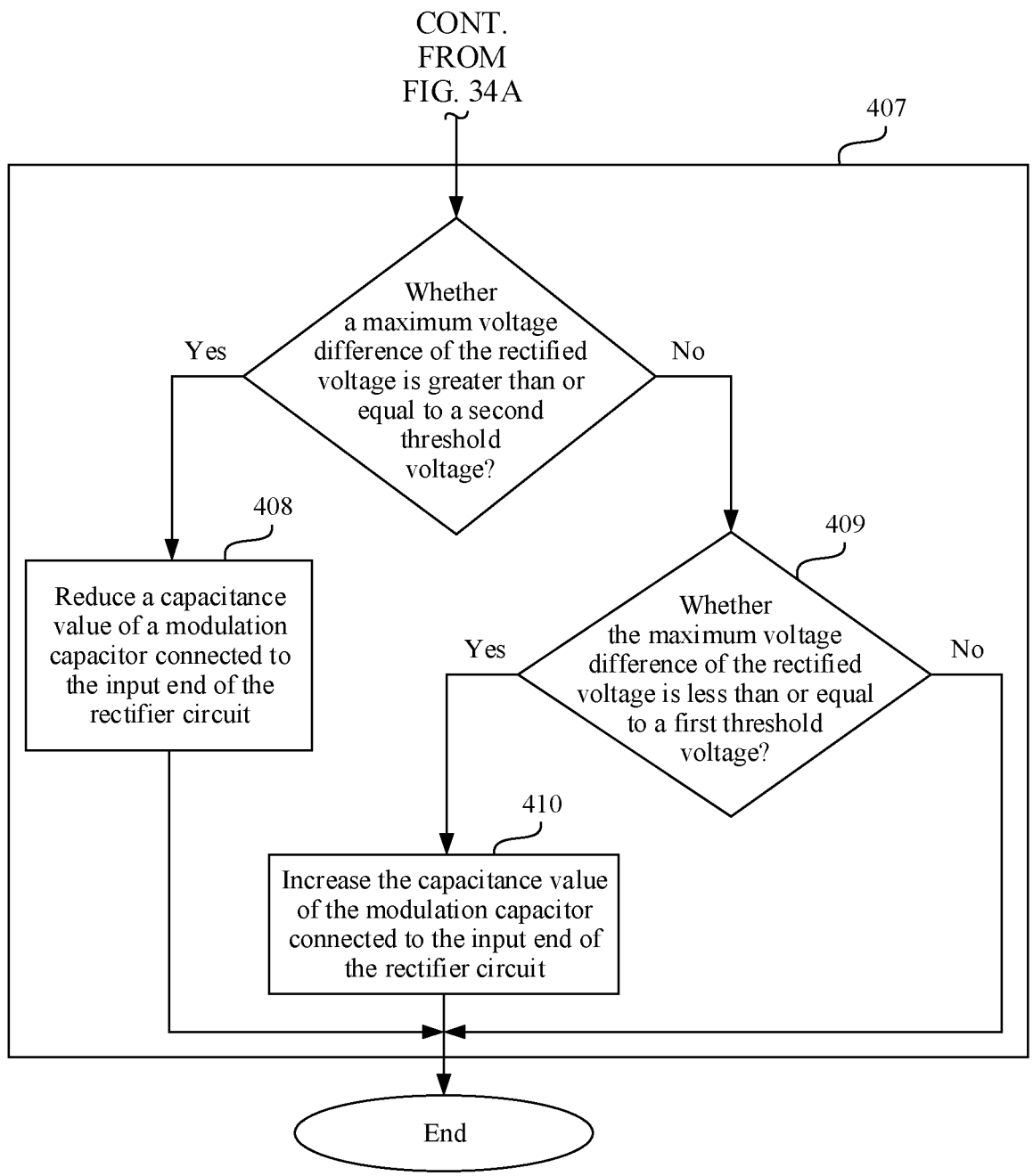

The foregoing examples 1, 2, and 3 provide three electronic devices. However, improvement solutions included in the foregoing three electronic devices may work independently, or two or all of the improvement solutions may be disposed in the same electronic device. With reference to the foregoing solutions in the example 1, example 2, and example 3, when the electronic device includes the resonant circuit 201 provided in the example 1, the load control circuit 208 provided in the example 2, and the modulation circuit 202 provided in the example 3, to implement an adaptive optimal modulation waveform of the electronic device in a wireless charging process, an embodiment of this application further provides a control method for an electronic device. With reference to FIG. 34A and FIG. 34B, the method specifically includes the following steps.

401. A device circuit detects a rectified voltage, and determines whether negative ASK modulation of the rectified voltage occurs.

After the electronic device starts communication and establishes wireless charging power transmission, the electronic device first determines whether negative ASK modulation occurs on the electronic device. A reason is that if negative ASK modulation of the rectified voltage occurs, the electronic device directly stops power transmission. When the device circuit determines that negative ASK modulation of the rectified voltage occurs, the process goes to step 402. If negative ASK modulation of the rectified voltage does not occur, the process goes to step 403.

402. A resonant capacitor control circuit adjusts a capacitance value of a resonant capacitor connected to a resonant circuit.

If positive ASK modulation of the rectified voltage is recovered by adjusting the capacitance value of the resonant capacitor coupled to the resonant circuit, the process goes to step 401. For a specific method for adjusting the capacitance value of the resonant capacitor coupled to the resonant circuit, refer to the description in the foregoing example 1. For example, the resonant capacitor control circuit increases the capacitance value of the resonant capacitor coupled to the resonant circuit. Details are not described herein again. Otherwise, the electronic device ends power transmission.

403. A load control circuit connects a resistance value to an input end of a rectifier circuit when the rectified voltage is at a low level.

Because the electronic device is usually in a light load state after establishing power transmission for wireless charging, the load control circuit connects the resistance value to the input end of the rectifier circuit when the rectified voltage is at the low level (which may be, for example, a first resistance value), to avoid a waveform distortion when the rectified voltage is at the low level. For a specific mode of connecting the resistance value to the input end of the rectifier circuit when the rectified voltage is at the low level, refer to the description in the example 2. Details are not described herein again.

404. The device circuit is further configured to detect power corresponding to the rectified voltage and power consumed by the resistance value connected by the load control circuit to the input end of the rectifier circuit; and determine whether the power corresponding to the rectified voltage is greater than the power consumed by the resistance value.

When the power corresponding to the rectified voltage is greater than the power consumed by the resistance value, the process goes to step 405, or when the power corresponding to the rectified voltage is less than or equal to the power consumed by the resistance value, the process goes to step 406.

405. The load control circuit disconnects the resistance value.

406. The load control circuit keeps connecting the resistance value to the input end of the rectifier circuit when the rectified voltage is at the low level.

407. A modulation circuit adjusts a capacitance value of a modulation capacitor connected to the input end of the rectifier circuit.

Specifically, the device circuit detects the rectified voltage and determines whether a maximum voltage difference of the rectified voltage is greater than or equal to a second threshold voltage.

When the maximum voltage difference of the rectified voltage is greater than or equal to the second threshold voltage, the process goes to step 408; otherwise, the process goes to step 409.

408. When the rectified voltage is at the low level, the modulation circuit reduces the capacitance value of the modulation capacitor connected to the input end of the rectifier circuit.

After the capacitance value of the modulation capacitor connected to the input end of the rectifier circuit is adjusted to make the maximum voltage difference of the rectified voltage less than the second threshold voltage, the electronic device normally performs power transmission until the end.

409. The device circuit detects the rectified voltage and determines whether the maximum voltage difference of the rectified voltage is less than or equal to a first threshold voltage.

When the maximum voltage difference of the rectified voltage is less than or equal to the first threshold voltage, the process goes to step 410; otherwise, the electronic device normally performs power transmission until the end.

410. When the rectified voltage is at the low level, the modulation circuit increases the capacitance value of the modulation capacitor connected to the input end of the rectifier circuit.

After the capacitance value of the modulation capacitor connected to the input end of the rectifier circuit is adjusted to make the maximum voltage difference of the rectified voltage greater than the first threshold voltage, the electronic device normally performs power transmission until the end.

It should be noted that the order of steps 403 to 406 and steps 407 to 410 is not limited in this embodiment of this application. To be specific, after steps 401 and 402 are performed to ensure that the rectified voltage is in a state of positive ASK modulation, step 407 may be performed after step 403, or step 403 is performed after step 407. Specifically, which of steps 403 and 407 first satisfies a corresponding determining condition is considered. Usually, because the electronic device is in a light load state after communication is initially established for wireless charging, step 403 usually satisfies the determining condition first, and step 407 usually satisfies the corresponding determining condition only in a full load or heavy load condition in the power transmission process.

Figure 22:
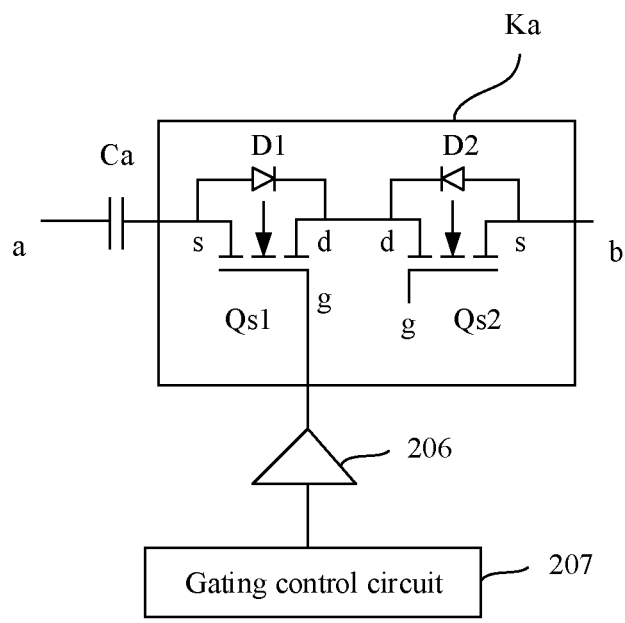
FIG. 22 is a schematic diagram of a structure of a first switch according to an embodiment of this application.

With reference to the solutions in the foregoing examples 1, 2, and 3, when the electronic device includes the resonant circuit 201 provided in the example 1, the load control circuit 208 provided in the example 2, and the modulation circuit 202 provided in the example 3, and the resonant circuit includes the resonant capacitor control circuit provided in FIG. 22 (Cb in FIG. 22 may be the resonant capacitor (C2 in FIG. 4)), and the modulation circuit 202 includes the modulation circuit provided in FIG. 31 (Cb in FIG. 31 may be the modulation capacitor (Cm1 (Cm2) in FIG. 5)), the electronic device satisfies the following operating conditions, and clears the control method logic provided in embodiments of this application, for example, with regard to the solution provided in the example 1, stops the control of the first switch Ka on the resonant capacitor regulating branch, keeps the first switch Ka on the resonant capacitor regulating branch in the off state, and can connect only the second capacitor Cb in FIG. 22 to the resonant circuit; with regard to the solution provided in the example 2, disconnects the resistance value connected by the load control circuit 208 to the input end of the rectifier circuit 202; and with regard to the solution provided in the example 3, stops the control of the second switch Kb on the modulation capacitor branch, keeps the second switch Kb on the modulation capacitor branch in the off state, and can connect only the second capacitor Cb in FIG. 31 to the input end AC1 (AC2) of the rectifier circuit. Operating condition 1: The electronic device does not require a wireless charging power supply (for example, the battery is fully charged, and a user operation instruction instructs to disconnect the wireless charging power supply). Operating condition 2: The electronic device is in a critical region of ping (a detection waiting stage, in which a transmitting terminal detects whether a potential receiving terminal electronic device is a power receiver or whether a power receiver requires power transmission), and does not need to have good ASK communication with the transmitting terminal; and the electronic device is located in the critical region of ping. In this case, power transmission efficiency is very low. In this case, if communication between the terminal device and the transmitting terminal is forcibly optimized, it is a waste of electric energy to maintain power transmission. Therefore, the electronic device is not controlled in the critical region of ping. Operating condition 3: The electronic device is under overvoltage protection, overcurrent protection, overtemperature protection, or the like. The operating condition 1 and the operating condition 3 can be determined by the device circuit 50 based on a current running state of the device. The operating condition 2 needs to be determined by the device circuit 50 based on operating parameters collected for the rectifier circuit and the voltage conversion circuit. Specifically, for a variable-frequency system, when Vout*Iout≤Pout_Th && Freq_op≤Freq_th, it is determined that the operating condition 2 is satisfied; and for a fixed-frequency system, when Vrect≤Vrect_th && Thold≥Tth, it is determined that the operating condition 2 is satisfied. Vout is an output voltage of the IDO, Iout is an output current of the IDO, Pout_Th is an output power threshold, Freq_op is an operating frequency of the power receiving terminal electronic device, and Freq_th is a frequency threshold. Freq_op in the Qi specification is generally 100-200 kHz, and Freq_th may be set to 110 kHz or the like based on an actual situation. Thold is duration when Vrect≤Vrect_th. Therefore, the fixed-frequency system satisfies the second operating condition only when Vrect≤Vrect_th within a range of Thold≥Tth.

The foregoing descriptions are only specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An electronic device, comprising a device circuit, a voltage conversion circuit, a rectifier circuit, a resonant circuit, and an amplitude shift keying (ASK) modulation circuit, wherein an input end of the device circuit is coupled to an output end of the voltage conversion circuit, an input end of the voltage conversion circuit is coupled to an output end of the rectifier circuit, an input end of the rectifier circuit is coupled to an output end of the resonant circuit, and the ASK modulation circuit is coupled to the input end of the rectifier circuit and the resonant circuit; the resonant circuit is configured to induce an alternating magnetic field sent by a power transmitting terminal device to generate an induced alternating current; the ASK modulation circuit is configured to modulate an amplitude of the induced alternating current; the rectifier circuit is configured to rectify the amplitude-modulated induced alternating current to generate a rectified voltage; and the voltage conversion circuit is configured to convert the rectified voltage into a load voltage and output the load voltage to the device circuit; and the resonant circuit comprises:

a resonant inductor and a resonant capacitor control circuit, wherein a first end of the resonant inductor is coupled to the rectifier circuit, the resonant capacitor control circuit is connected in series between the resonant inductor and the rectifier circuit, a first end of the resonant capacitor control circuit is coupled to a second end of the resonant inductor, and a second end of the resonant capacitor control circuit is coupled to the rectifier circuit; and wherein the resonant capacitor control circuit comprises a plurality of parallel modulation capacitor branches each having a capacitor, the first end and the second end of the resonant capacitor control circuit are two common ends of the plurality of parallel modulation capacitor branches, the plurality of parallel modulation capacitor branches comprise one or more first modulation capacitor branches each having a corresponding capacitor and a switch connected in series to the corresponding capacitor, and a status of the switch is controllable to adjust a capacitance value of a resonant capacitor coupled to the resonant circuit.

2. The electronic device according to claim 1, wherein the switch comprises a bidirectional switching transistor.

3. The electronic device according to claim 1, wherein the device circuit is further configured to detect the rectified voltage to determine that negative ASK modulation of the rectified voltage occurs, the resonant capacitor control circuit increases the capacitance value of the resonant capacitor coupled to the resonant circuit, to recover positive ASK modulation of the rectified voltage.

4. The electronic device according to claim 1, further comprising a load control circuit, wherein the load control circuit is coupled to the input end of the rectifier circuit, and the load control circuit is configured to connect a resistance value to the input end of the rectifier circuit when the rectified voltage is at a low level.

5. The electronic device according to claim 4, wherein the device circuit is further configured to detect a first power corresponding to the rectified voltage and a second power consumed by the resistance value connected by the load control circuit to the input end of the rectifier circuit; and the load control circuit is configured to disconnect the resistance value when it is determined that the first power corresponding to the rectified voltage is greater than the second power consumed by the resistance value.

6. The electronic device according to claim 1, wherein the ASK modulation circuit comprises a capacitance value switching network formed by at least one switch and at least one capacitor, with the at least one switch being controlled to adjust a capacitance value of a modulation capacitor connected to the input end of the rectifier circuit.

7. The electronic device according to claim 6, wherein the device circuit is further configured to detect the rectified voltage; and when a maximum voltage difference of the rectified voltage is less than or equal to a first threshold voltage and the rectified voltage is at the low level, the ASK modulation circuit is configured to increase the capacitance value of the modulation capacitor connected to the input end of the rectifier circuit; or when a maximum voltage difference of the rectified voltage is greater than or equal to a second threshold voltage and the rectified voltage is at the low level, the ASK modulation circuit is configured to reduce the capacitance value of the modulation capacitor connected to the input end of the rectifier circuit, wherein the second threshold voltage is greater than the first threshold voltage.

8. The electronic device according to claim 1, wherein the resonant capacitor control circuit is configured to adjust the capacitance value of the resonant capacitor in according to a status of ASK modulation comprising negative ASK modulation or positive ASK modulation.

9. The electronic device according to claim 1, wherein the plurality of parallel modulation capacitor branches comprises a second modulation capacitor branch having a capacitor and without a switch.

10. An electronic device, comprising a device circuit, a voltage conversion circuit, a rectifier circuit, a resonant circuit, and an amplitude shift keying (ASK) modulation circuit, wherein an input end of the device circuit is coupled to an output end of the voltage conversion circuit, an input end of the voltage conversion circuit is coupled to an output end of the rectifier circuit, an input end of the rectifier circuit is coupled to an output end of the resonant circuit, and the ASK modulation circuit is coupled to the input end of the rectifier circuit and the resonant circuit; the resonant circuit is configured to induce an alternating magnetic field sent by a power transmitting terminal device to generate an induced alternating current; the ASK modulation circuit is configured to modulate an amplitude of the alternating current; the rectifier circuit is configured to rectify the amplitude-modulated induced alternating current to generate a rectified voltage; and the voltage conversion circuit is configured to convert the rectified voltage into a load voltage and output the load voltage to the device circuit; and the electronic device further comprises a load control circuit, wherein the load control circuit is coupled to the input end of the rectifier circuit, and the load control circuit is configured to connect a resistance value to the input end of the rectifier circuit when the rectified voltage is at a low level.

11. The electronic device according to claim 10, wherein the load control circuit comprises a resistance value switching network formed by at least one switch and at least one resistor, and the load control circuit is configured to control a status of the switch to adjust the resistance value connected to the input end of the rectifier circuit.

12. The electronic device according to claim 11, wherein the load control circuit comprises a first switch and a first resistor, a first end of the first resistor is coupled to the input end of the rectifier circuit, a second end of the first resistor is coupled to a first end of the first switch, and a second end of the first switch is grounded.

13. The electronic device according to claim 10, wherein the device circuit is further configured to detect a first power corresponding to the rectified voltage and a second power consumed by the resistance value connected by the load control circuit to the input end of the rectifier circuit; and the load control circuit is configured to disconnect the resistance value when it is determined that the first power corresponding to the rectified voltage is greater than the second power consumed by the resistance value.

* * * * *